(12) United States Patent
Satoh et al.

(10) Patent No.: US 6,294,229 B1
(45) Date of Patent: Sep. 25, 2001

(54) FILM FOR OPTICAL ELEMENTS

(75) Inventors: Yasushi Satoh; Hitoshi Mazaki; Teruaki Yamanashi; Yoshihiro Kobori, all of Kanagawa (JP)

(73) Assignee: Nippon Mitsubishi Oil Company, Tokyo (JP)

( * ) Notice: Subject to any disclaimer, the term of this patent is extended or adjusted under 35 U.S.C. 154(b) by 0 days.

(21) Appl. No.: 09/378,036

(22) Filed: Aug. 20, 1999

(30) Foreign Application Priority Data

Aug. 21, 1998 (JP) .................................................. 10-235834

(51) Int. Cl.⁷ ......................... C09K 19/52; C09K 19/04; C09K 19/38
(52) U.S. Cl. ........................ 428/1.1; 428/1.3; 252/299.01
(58) Field of Search ........................ 252/299.01; 349/96, 349/99, 76, 134, 123, 102; 428/1.1, 1.3

(56) References Cited

U.S. PATENT DOCUMENTS

| 5,460,748 | 10/1995 | Mazaki et al. | 252/299.01 |
| 5,528,400 | * 6/1996 | Arakawa | 359/73 |
| 5,578,243 | 11/1996 | Mazaki et al. | 252/299.01 |
| 5,793,455 | * 8/1998 | Nakamura | 349/96 |
| 5,943,110 | * 8/1999 | Yoda et al. | 349/134 |
| 5,978,055 | * 11/1999 | Van De Wittte et al. | 349/119 |
| 5,986,734 | * 11/1999 | Winker et al. | 349/123 |

* cited by examiner

*Primary Examiner*—Shean C. Wu
(74) *Attorney, Agent, or Firm*—Scully, Scott, Murphy & Presser

(57) ABSTRACT

A film for optical elements is formed by a liquid crystalline composition comprising the following components (a) and (b):

(a) a liquid crystalline polymer which exhibits an optically positive uniaxial property; and (b) a polycyclic compound having a molecular weight of not more than 1,000 and wherein a plurality of alicyclic rings and/or aromatic rings are connected together through a linkage chain of 0 to 4 main-chain carbon atoms bonded to different ring carbon atoms, with hydrocarbon groups each having 1 to 20 carbon atoms being bonded respectively to both end rings through a linkage chain of 0 to 4 main-chain carbon atoms, an orientation form formed in the state of liquid crystal of said liquid crystalline composition being fixed.

6 Claims, 7 Drawing Sheets

(μm)
Film Thickness (Side View of Film)

FILM FOR OPTICAL ELEMENTS

FIELD OF THE INVENTION

The present invention relates to a film for optical elements in which the orientation of a composition containing a liquid crystalline polymer exhibiting a uniaxial property is fixed. More particularly, the invention is concerned with a viewing angle improving film and a twisted nematic liquid crystal display device having the said film.

BACKGROUND OF THE INVENTION

An active drive twisted nematic type liquid crystal display device (hereinafter referred to simply as "TN-LCD") using TFT element or MIM element affords an image quality comparable to a CRT as seen from the front side, in addition to the characteristics inherent in LCD such as small thickness, light weight and low power consumption. For this reason, the TN-LCD is spread widely as a display for notebook type personal computers, portable telephone and portable information terminals. However, the conventional TN-LCD inevitably involves a problem associated with a viewing angle such that there occurs change in display color or a lowering of display contrast when seen obliquely, due to refractive index anisotropy. It has keenly been desired to solve this problem, and various attempts have been made for improvement. For example, there have been proposed a method (halftone gray scale method) wherein one pixel is divided and the voltage applied to each divided pixel is changed at a certain ratio, a method (domain dividing method) wherein one pixel is divided and a rising direction of liquid crystal molecules in each divided pixel is changed, a method (IPS method) wherein a lateral electric field is applied to liquid crystal, a method (VA liquid crystal method) wherein a vertically oriented liquid crystal is driven, and a method (OCB method) wherein a bend orientation cell and an optical compensator are combined together. Developments and trial manufacture have been made in connection with these proposed methods.

Although these methods afford certain effects, it is necessary that alignment layer, electrodes and liquid crystal orientation be changed from those so far adopted.

For this change it is required to establish appropriate manufacturing techniques and new manufacturing equipment, with consequent difficulty of manufacture and increase of cost.

On the other hand, a method has been proposed wherein the viewing angle is enlarged by incorporating an optical compensating film in the conventional TN-LCD without changing at all the structure of TN-LCD itself. This method is simple and very economical because it is not necessary to make reform or increase of the TN-LCD manufacturing equipment. For this reason, this method is now attracting attention of many concerns.

In manufacturing the said film, the following are mentioned as examples of conditions required of the film material:
1) Should a high reliability worthy of commercialization in point of resistance to heat, moisture and light.
2) Should be capable of being oriented under wide conditions and should afford products having little irregularity and few orientation defects.
3) Should have a high film strength and a sufficient impact resistance and be superior in handleability.

However, in the case of forming a film with use of a known film material, it has been difficult for the film to fully satisfy all of the above conditions. Under the circumstances, it has been considered necessary to develop a material which satisfies the above conditions without deteriorating the optical performance of the film.

OBJECTS OF THE INVENTION

It is an object of the present invention to solve the above-mentioned problems and particularly provide a film for optical elements which film is of a good quality, superior in reliability and strength and having few defects and little irregularity.

SUMMARY OF THE INVENTION

The present invention, in the first aspect thereof, resides in a film for optical elements, formed by a liquid crystalline composition comprising the following components. (a) and (b):
(a) a liquid crystalline polymer which exhibits an optically positive uniaxial property; and
(b) a polycyclic compound having a molecular weight of not more than 1,000 and wherein a plurality of alicyclic rings and/or aromatic rings are connected together through a linkage chain of 0 to 4 main-chain carbon atoms bonded to different ring carbon atoms, with hydrocarbon groups each having 1 to 20 carbon atoms being bonded respectively to both end rings through a linkage chain of 0 to 4 main-chain carbon atoms,
an orientation form formed in the state of liquid. crystal of the said liquid crystalline composition being fixed.

The present invention, in the second aspect thereof, resides in the above film for optical elements, wherein the orientation form is a nematic hybrid orientation form.

DETAILED DESCRIPTION OF THE INVENTION

Figure 1:
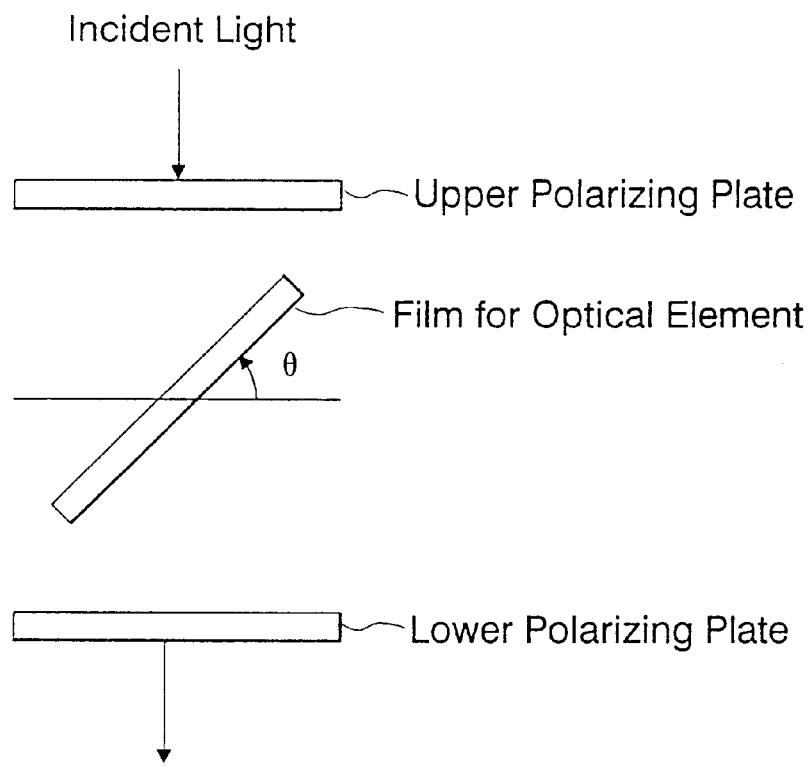
FIG. 1 is a layout diagram of an optical measurement system used in measuring a tilt angle of the film for optical elements according to the present invention.

The present invention will be described in more detail hereinunder.

The film for optical elements according to the present invention is applicable to various optical elements by adjusting the orientation form of the liquid crystalline polymer which determines optical characteristics of the film. For example, the film of the invention is employable suitably as optically functional films typical of which are a viewing angle improving film, a color compensating film, and a polarizing film. Particularly, the film with a nematic hybrid orientation fixed is suitable as a viewing angle improving film for TN-LCD and it can greatly improve the viewing angle dependence of TN-LCD.

A description will now be given of TN-LCD to be subjected to compensation. TN-LCDs can be classified by driving methods into a simple matrix type and an active matrix type using an active element such as electrode, i.e., TFT (Thin Film Transistor) electrode or MIM (Metal Insulator Metal) or TFD (Thin Film Diode) electrode. For any of the driving methods the viewing angle improving film of the present invention exhibits an outstanding viewing angle improving effect.

The known halftone gray scale method (pixel dividing method) and domain dividing method have been developed in an effort to widen the viewing angle of LCD from the driving liquid crystal cell side. Even for such LCDs somewhat improved in viewing angle, the viewing angle improving film of the present invention is effective and can make a further improvement for the viewing angle.

It is desirable that the film in question have a fixed nematic hybrid orientation. The nematic hybrid orientation indicates an orientation form wherein the liquid crystalline polymer is nematic-oriented and the angle of director in the liquid crystalline polymer relative to the film upper surface and the angle of director in the liquid crystalline polymer relative to the film lower surface are different from each other. Thus, since the director-film surface angle is different between the vicinity of the upper interface and the vicinity of the lower interface, it can be said that the said angle changes continuously between the upper and lower surfaces of the film.

In the viewing angle improving film of the present invention having the nematic hybrid orientation form, the directors of the liquid crystalline polymer face at different angles at all positions in the film thickness direction. Thus, when the film is observed as a structure, there no longer is any optical axis.

The film in question can be obtained by using a liquid crystalline composition comprising (a) a liquid crystalline polymer which exhibits an optically positive uniaxial property and (b) a specific compound which will be described later.

As examples of the liquid crystalline polymer are mentioned condensed type liquid crystalline polymers obtained by condensing compounds having carboxyl, alcohol, phenol, amino, or thiol group, liquid crystalline vinyl polymers starting from liquid crystalline compounds having a double bond such as acryloyl, methacryloyl, vinyl, or allyl group, liquid crystalline polysiloxanes prepared from liquid crystalline compounds having alkoxysilane group, liquid crystalline epoxy resins prepared from liquid crystalline compounds having epoxy group, and mixtures of these liquid crystalline polymers. Above all, condensed type liquid crystalline polymers are most preferred in view of optical characteristics of the resulting film.

Usually, a condensed type liquid crystalline polymer can be prepared by condensing a bifunctional monomer in a suitable manner. As the bifunctional monomer, an aromatic or cyclohexane ring-containing bifunctional monomer is preferred. Examples are diamines such as phenylenediamine, diols such as hydroquinone, 2-methylhydroquinone, resorcinol, catechol, 4-methylcatechol, 4-tert-butylcatechol, and 2,3-dihydroxynaphthalene, dithiols such as 1,4-phenylenedithiol and 1,2-phenylenedithiol, hydroxycarboxylic acids such as salicylic acid, 3-hydroxybenzoic acid, 4-hydroxybenzoic acid, 3-hydroxy-2-naphthoic acid, 6-hydroxy-2-naphthoic acid, and 7-hydroxy-2-naphthoic acid, amino acids such as 2-aminobenzoic acid, 3-aminobenzoic acid, and 4-aminobenzoic acid, and dicarboxylic acids such as phthalic acid, isophthalic acid, terephthalic acid, 1,4-naphthalenedicarboxylic acid, 2,6-naphthalenedicarboxylic acid, 2,7-naphthalenedicarboxylic acid, 4,4'-biphenyldicarboxylic acid, 4,4'-stilbenedicarboxylic acid, and 1,4-cyclohexanedicarboxylic acid. Particularly, condensed type liquid crystalline polymers containing a catechol unit as a hydroxyl-containing component and as an essential structural unit are most preferred.

Also employable are condensed type liquid crystalline polymers obtained by adding any of the following compounds into the starting monomer to such an extent as will not destroy the liquid crystallinity: aliphatic dicarboxylic acids such as oxalic acid, fumaric acid, succinic acid, glutaric acid, adipic acid, pimelic acid, suberic acid, azelaic acid, and sebacic acid, aliphatic diols such as ethylene glycol, propylene glycol, butanediol, pentanediol, hexanediol, heptanediol, octanediol, nonanediol, and decanediol, aliphatic diamines such as diaminoethane, diaminopropane, diaminobutane, diaminopentane, diaminohexane, diaminoheptane, diaminooctane, diaminononane, and diaminodecane, aliphatic hydroxycarboxylic acids such as hydroxyacetic acid, hydroxypropionic acid, hydroxybutyric acid, hydroxyvaleric acid, hydroxyhexanoic acid, hydroxyheptanoic acid, hydroxyoctanoic acid, hydroxynonanoic acid, and hydroxydecanoic acid.

If necessary, a monofunctional monomer may be added into the starting monomer for modifying main-chain ends of the liquid crystalline polymer used. As examples of the monofunctional monomer are mentioned monomers containing one carboxyl, amine, alcohol, phenol, or thiol group in each molecule.

Aromatic and aliphatic carboxylic acids are mentioned as examples of carboxyl-containing monofunctional monomers.

As preferred examples of aromatic carboxylic acids are mentioned benzoic acids substituted in the 2-, 3-, or 4-position with a $C_{1-20}$ alkyl or alkoxy group such as methoxybenzoic acid, ethoxybenzoic acid, propoxybenzoic acid, butoxybenzoic acid, pentoxybenzoic acid, hexyloxybenzoic acid, heptyloxybenzoic acid, octyloxybenzoic acid, nonyloxybenzoic acid, decyloxybenzoic acid, toluic acid, ethylbenzoic acid, propylbenzoic acid, butylbenzoic acid, pentylbenzoic acid, hexylbenzoic acid, heptylbenzoic acid, octylbenzoic acid, nonylbenzoic acid, and decylbenzoic acid.

As examples of aliphatic carboxylic acids are aliphatic mentioned carboxylic acids having 2 to 20 carbon atoms such as acetic acid, propionic acid, butyric acid, pentanoic acid, hexanoic acid, heptanoic acid, octanoic acid, nonanoic acid, and decanoic acid.

Particularly preferred among the above monofunctional monomers are those substituted in the 4-position such as 4-methoxybenzoic acid, 4-ethoxybenzoic acid, 4-propoxybenzoic acid, 4-butoxybenzoic acid, 4-pentoxybenzoic acid, 4-hexyloxybenzoic acid, 4-heptyloxybenzoic acid, 4-octyloxybenzoic acid, 4-nonyloxybenzoic acid, and 4-decyloxybenzoic acid.

As examples of monofunctional monomers having an amine group are mentioned aromatic and aliphatic amines.

Examples of aromatic amines are anilines substituted in the 2-, 3-, or 4-position with a $C_{1-20}$ alkyl or alkoxy group, and examples of aliphatic amines are aliphatic amines having 2 to 20 carbon atoms.

Where required, the monofunctional monomers exemplified above may contain an optically active group. Examples are benzoic acid derivatives derived by partial substitution of aromatic rings with an optically active group, and optically active aliphatic acids. Particularly preferred are benzoic acid compounds with aromatic ring partially substituted by an optically active group, such as 4-methylpropoxybenzoic acid, 4-(2-methylbutoxy)benzoic acid, 4-methylbutoxybenzoic acid, 4-methylpentyloxybenzoic acid, 4-methylhexyloxybenzoic acid, 4-methylheptyloxybenzoic acid, 4-menthyloxybenzoic acid, 4-isomethyloxybenzoic acid, and 4-bornyloxybenzoic acid.

As examples of monofunctional monomers having a alcohol or phenol group are mentioned phenols and aliphatic alcohols. Examples of phenols include those substituted in the 2-, 3-, or 4-position with a $C_{120}$ alkyl, alkoxyl, or alkoxycarbonyloxy group. Examples aliphatic alcohols include those having 2 to 20 carbon atoms. As more concrete examples of such phenols and aliphatic alcohols are mentioned cresol, ethylphenol, nonylphenol, butanol, pentanol, hexanol, and cyclohexanol, with cresol and nonylphenol being preferred.

The alkyl, alkoxy and aliphatic groups referred to above may contain an unsaturated bond or may contain an optically active group.

If necessary, there also may be used monomers having three or more functional groups such as trimellitic acid, dihydroxybenzoic acid, hydroxybenzenedicarboxylic acid, benzenetricarboxylic acid, and pyromellitic acid, as well as optically active monomers such as 1-methylethanediol, 1-ethylethanediol, 1-methylpropanediol, 1-methylbutanediol, 2-methylbutanediol, 1-methylpentanediol, 2-methylpentanediol, cyclopentanediol, cyclohexanediol, 2-methylsuccinic acid, and 3-methyladipic acid.

No special limitation is placed on how to condense the above monomers to prepare condensed type liquid crystalline polymers, more particularly, liquid crystalline polyesters. Any method known in this field may be adopted. For example, there may be adopted a method involving activating a carboxylic acid by making the carboxylic acid into an acid halide or using a dicyclohexylcarbodiimide and subsequent reaction with alcohol or amine, a method involving subjecting phenol to an acetic-esterification and subsequent reaction with a carboxylic acid, allowing a deacetylation reaction to take place, or a method involving esterifying a carboxylic acid into an ester such as methyl ester, subsequent reaction with alcohol in the presence of a suitable solvent if necessary, and a dealcoholation reaction.

Two or more kinds of such condensed type liquid crystalline polymers exemplified above may be used as a mixture, or any of them may be mixed with a non-liquid crystalline polymer or a liquid crystalline vinyl polymer, polysiloxane or epoxy resin insofar as the effect of the present invention is not impaired thereby.

It is desirable that the liquid crystalline polymer used in the invention possess a tilt-orientability or a homeotropic-orientability in the state of liquid crystal. The tilt-orientability means a property capable of assuming a state such that when the liquid crystalline polymer is heat-treated on a suitable substrate with an upper side opposite to the substrate being made an air or vacuum side, an acute angle of director in the liquid crystalline polymer to a film surface in the vicinity of the air- or vacuum-side interface is larger than that in the vicinity of the substrate. On the other hand, the homeotropic-orientability means a property such that in the same case as above, the directors of the liquid crystalline polymer can assume a state of orientation nearly perpendicular to the substrate surface.

Whether the liquid crystalline polymer possesses a tilt-orientability or a homeotropic-orientability is determined by forming a layer of the liquid crystalline polymer on a substrate and judging the state of its orientation. The substrate employable in this judgment is not specially limited, but as examples there are mentioned glass substrates such as soda glass, potash glass, borosilicate glass, and optical glasses, e.g. crown glass and flint glass, as well as films and sheets of plastic materials which are heat-resistant in a temperature region in which the liquid crystalline polymer assumes a state of liquid crystal, such as polyethylene terephthalates, polyethylene naphthalates, polyphenylene oxides, polyimides, polyamide-imides, polyether imides, polyamides, polyether ketones, polyether ether ketones, polyketone sulfides, and polyether sulfones.

The substrate exemplified above is used after cleaning its surface with an acid, alcohol, or detergent. It is desirable that the aforesaid judgment of orientability be made on a substrate not having been subjected to any surface treatment such as silicone treatment, rubbing, or uniaxial stretching. But in the judgment of tilt-orientability there also may be used a substrate having been subjected to rubbing or uniaxial stretching.

It is desirable that the liquid crystalline polymer exhibiting a positive uniaxial property and used in the invention form a 0.1~1,000 $\mu$m thick film thereof on any of the substrates exemplified above and that when heat-treated at a temperature at which the liquid crystalline polymer presents a liquid crystal state, the polymer exhibits a tilt orientation or a homeotropic orientation on at least any one of the exemplified substrates. Certain liquid crystalline polymers exhibit a peculiar homeotropic orientation at temperatures near the liquid crystal-isotropic phase transition point. Usually, therefore, it is preferable that the above heat treatment be conducted at a temperature 15° C., preferably 20° C., lower than the liquid crystal-isotropic phase transition point. In this case, if the liquid crystalline polymer exhibits a tilt orientation, it is possible to see a state (a state of opposite tilt directions as will be described later) in which a discrimination line is observed despite the quenching axes of adjacent domains being the same. If the polymer exhibits a homeotropic orientation, it is possible to make sure the orientation with use of a conoscope or the like.

The molecular weight of the liquid crystalline polymer used in the present invention is usually in the range of 0.01 to 1.0, preferably 0.03 to 0.5, more preferably 0.05 to 0.3, in terms of an inherent viscosity as determined in any of various solvents, say, a mixed phenol/tetrachloroethane (60/40 weight ratio) solvent, at 30° C. If the inherent viscosity is lower than 0.01, the mechanical strength of the resulting film may be deteriorated or the reliability thereof against high temperature and high humidity may be impaired. If the inherent viscosity is higher than 1.0, there is a fear that the orientation may be impaired or the viscosity in the formation of liquid crystal may become too high, with consequent increase of the time required for orientation.

The present invention provides a liquid crystalline composition obtained by adding to the above liquid crystalline polymer (a) which exhibits an optically positive uniaxial property a polycyclic compound (b) having a molecular weight of not more than 1,000 and wherein a plurality of alicyclic rings and/or aromatic rings are connected together through a linkage chain of 0 to 4 main-chain carbon atoms bonded to different ring carbon atoms, with hydrocarbon groups each having 1 to 20 carbon atoms being bonded respectively to both end rings through a linkage chain of 0 to 4 main-chain carbon atoms.

The polycyclic compound (b) used in the present invention, which has the above chemical structural characteristic, can be represented by the following general formula (1):

where $R^1$ and $R^2$ are each independently a hydrocarbon group having 1 to 20 carbon atoms, $A^1$ to $A^n$ are each a ring structure bonded through different constituent atoms to two adjacent $B^n$s, $B^1$ to $B^{n+1}$ are each a single bond or an organic group of 1 to 4 atoms interposed between any of adjacent $R^1$, $R^2$, and $A^n$, and n is an integer of 2 to 8.

The $A^1$ to $A^n$ are each a ring structure bonded through different constituent atoms to two adjacent $B^n$s. It is preferable that the ring structures include at least one six-membered ring. The ring structures as referred to herein are represented as aliphatic rings and/or aromatic rings. As examples thereof, mention may be made of benzene group, indene group, polycyclic aromatic groups such as naphthalene, anthracene, phenanthrene, triphenylene, pyrene, and perylene, heteroaromatic groups such as pyridine, pyrimidine, pirazine, pyridazine, and triazole, and polycyclic aromatic groups containing a hetero-atom such as isoquinoline and quinoline. The ring structures may be such that the aromatic groups exemplified above are connected together through a plurality of non-aromatic ring structures, examples of which include fluorene, acenaphthylene, dibenzofuran, carbazole, xanthene, phenoxazine, phenazine, and dibenzodioxin groups. Unsaturated bonds in the ring structures may be hydrogenated partially or wholly, examples of which include cyclohexane, cyclohexene, tetrahydroxynaphthalene, decahydroxynaphthalene, and acenaphthene groups. Where required, the ring structures may each contain one or more substituent groups. As examples of such substituent groups are mentioned $C_{1-10}$ hydrocarbon groups, as well as alkoxy, phenoxy, trifluoromethyl, hydroxyl, amino, and nitro groups, and halogen atoms. If plural substituent groups are present, they may be the same or different.

In the general formula (1), $B^1$ to $B^{n+1}$ are each a single bond or an organic group of 1 to 4 atoms interposed between any of adjacent $R^1$, $R^2$, and $A^n$, provided the intervening atoms do not constitute a part of the ring structures. As examples of such organic groups are mentioned:

—O—, —NR$_1$—, —(C=O)—, —O—(C=O)—,
—NR—(C=O)—, —CR$_1$=CR$_1$—, —C≡C—,
—CR$_2$—CR$_1$=CR$_1$—CR$_2$—, —CR$_2$—, —CR$_2$—C≡C—CR$_2$—,
—O—(C=O)—C≡C—, —(S=O)—,
—NR$_1$—(C=O)—CR$_1$=CR$_1$—, —O—CR$_1$=CR$_1$—O—,
—O—(C=O)—C=C—,
—(CR$_2$)$_n$—(n=1~4),
—O—(CR$_2$)$_n$—O—(n=1~2)
—(CR$_2$)$_n$—O—CH$_2$— (n=1, 2),
—O—(CR )$_n$—(n=1~3),
—O—(C=O)—(CR$_2$)$_n$—(n=1~2),
—NR—(CR$_2$)$_n$—(n=1~3),
—N=CH—(CR$_2$)$_n$—(n=0~2),
—(CR$_2$)$_n$—O—(CO)—(n=1~2), where $R_1$ and $R_2$ are each a hydrogen atom or a hydrocarbon group having 1 to 10 carbon atoms, provided $R_1$s need not be the same, and if there are n number of $R_2$s, the $R_2$s may be mutually different.

The following organic groups are particularly preferred:
—O—, —(C=O)—, —O—(C=O)—, —NR$_1$—(C=O)—,
—CR$_1$=CR$_1$—, —NR$_1$—(C=O)—CR$_1$=CR$_1$—,
—O—(C=O)—CR$_1$=CR$_1$—, —(CR$_2$)$_n$—(n=1~4),
—O—(CR$_2$)$_n$—O—(n=1~4),
—(CR$_2$)$_n$—O—CH$_2$—(n=1, 2),
—O—(CR$_2$)$_n$—(n=1~3),
—O—(C=O)—(CR$_2$)$_n$—(n=1~2),
—(CR$_2$)$_n$—O—(CO)—(n=1~2), In the general formula (1), $R^1$ and $R^2$ are each independently a hydrocarbon group having 1 to 20 carbon atoms. Examples are straight-chain, saturated hydrocarbon groups such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl; branched, secondary or tertiary, saturated hydrocarbon groups such as methylethyl, 1-methylpropyl, 2-methylpropyl, 1-methylbutyl, 2-methylbutyl, 3-methylbutyl, 1-methylpentyl, 2-methylpentyl, 3-methylpentyl, 4-methylpentyl, 1-methylhexyl, 2-methylhexyl, 3-methylhexyl, 4-methylhexyl, 5-methylhexyl, 1-methylheptyl, 2-methylheptyl, 3-methylheptyl, 4-methylheptyl, 5-methylheptyl, 6-methylheptyl, 1-methyloctyl, 1-methylnonyl, 3,7-dimethyloctyl, 3,5,5-trimethylhexyl, and dimethylethyl; unsaturated hydrocarbon groups such as allyl, butenyl, pentenyl, and hexenyl; and hydrocarbon groups having a cyclic structure such as cyclopentyl, cyclohexyl, cyclohexenyl, cyclohexylmethyl, cyclohexylethyl, cyclohexylpropyl, phenyl, benzyl, phenethyl, naphthyl, naphthylmethyl, menthyl, norbornyl, bornyl, and isomenthyl.

More concrete structural formulas of the foregoing general formula (1) will be described below:

Structural Formula 1

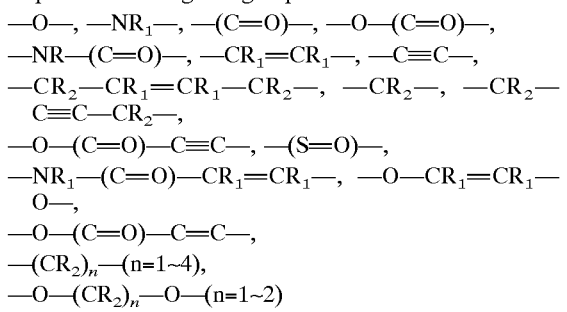

In the structural formula 1, $R^1$ and $R^2$ are each independently a hydrocarbon group having 1 to 20 carbon atoms, $R^3$ to $R^{10}$ are each independently a hydrogen atom, F, Cl, Br, $C_{1-6}$ hydrocarbon group or alkoxy group, $X_1$ is a single bond or at least one organic group selected from group A, $X_2$ and $X_3$ are each a single bond or an organic group selected from —O— and —O—(C=O)—, provided in the organic groups of $X_1$, $X_2$ and $X_3$ there also is included a structural formula with valences being reversed right and left.

<Group A>

—O—, —(C=O)—, —O—(C=O)—, —NR$_1$—(C=O)—,
—CR$_1$=CR$_1$—, —NR$_1$—(C=O)—CR$_1$=CR$_1$—,
—O—(C=O),
—(CR$_2$)$_n$—(n=1~4),
—O—(CR$_2$)$_n$—O—(n=1~4),
—(CR$_2$)$_n$—O—CH$_2$—(n=1, 2),
—O—(CR$_2$)$_n$—(n=1~3),
—O—(C=O)—(CR$_2$)n (n=1~2),
—(CR$_2$)$_n$—O—(C=O)—(n=1~2), where R$_1$ and R$_2$ are each independently a hydrogen atom or a hydrocarbon group having 1 to 10 carbon atoms, provided Rs need not be the same, and if there are n number of R$_2$s, the R$_2$s may be mutually different.

Structural Formula 2

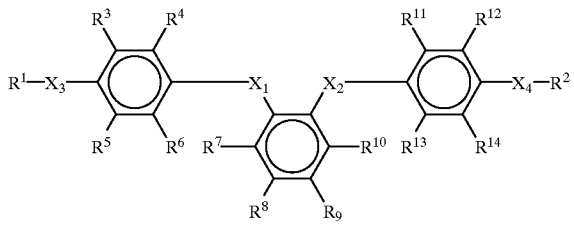

In the structural formula 2, R$^1$ and R$^2$ are each independently a hydrocarbon group having 1 to 20 carbon atoms, R$^3$ to R$^{14}$ are each independently a hydrogen atom, F, Cl, R, C$_{1-6}$ hydrocarbon group or alkoxy group, X$_1$ and X$_2$ are each independently a single bond or at least one organic group selected from group A, and X$_3$ and X$_4$ are each independently a single bond or an organic group selected from —O— and —O—(C=O), provided in the organic groups of X$_1$, X$_2$, X$_3$ and X$_4$ there also is included a structure with valences being reversed right and left.

<Group A>

—O—, —(C=O)—, —O—(C=O)—, —NR$_1$—(C=O)—,
—CR$_1$=CR$_1$—, —NR$_1$—(C=O)—CR$_1$=CR$_1$—,
—O—(C=O)—CR$_1$=CR$_1$—,
—(CR$_2$)$_n$—(n=1~4),
—O—(CR$_2$)$_n$—O—(n=1~4),
—(CR$_2$)$_n$—O—CH$_2$—(n=1, 2),
—O—(CR$_2$)$_n$—(n=1~3),
—O—(C=O)—(CR$_2$)$_n$—(n=1~2),
—(CR$_2$)$_n$—O—(C=O)—(n=1~2)

Where R$_1$ and R$_2$ are each independently a hydrogen atom or a hydrocarbon group having 1 to 10 carbon atoms, provided R$_1$ need not be the same, and if there are n number of R$_2$, the R$_2$s may be different from each other.

Structural Formula 3

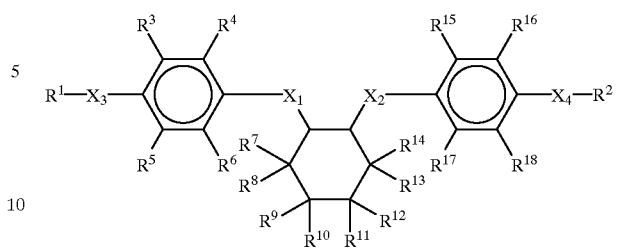

In the structural formula 3, R$^1$ and R$^2$ are each independently a hydrocarbon group having 1 to 20 carbon atoms, R$^3$ to R$^{18}$ are each independently a hydrogen atom, F, Cl, Br, C$_{1-6}$ hydrocarbon group or alkoxy group, X$_1$ and X$_2$ are each independently a single bond or at least one organic group selected from group A, and X$_3$ and X$_4$ are each independently a single bond or an organic group selected from —O— and —O—(C=O)—, provided in the organic groups of X$_1$, X$_2$, X$_3$ and X$_4$ there also is included a structural formula with valences being reversed right and left:

—CR$_1$=CR$_1$—, —NR$_1$—(C=O)—CR$_1$=CR$_1$—,
—O—(C=O)$_n$—CR$_1$=CR$_1$—,
—(CR$_2$)$_n$—(n=1~4),
—O—(CR$_2$)$_n$—O—(n=1~4),
—(CR$_2$)$_n$—O—CH$_2$—(n=1, 2),
—O—(CR$_2$)$_n$—(n=1~3),
—O—(C=O)—(CR$_2$)$_n$—(n=1~2),
—(CR$_2$)$_n$—(C=O)—(n=1~2)

where R$_1$ and R$_2$ are each independently a hydrogen atom or a hydrocarbon group having 1 to 10 carbon atoms, provided R$^1$s need not be the same, and if there are n number of R$_2$s, the R$_2$s may be mutually different.

Structural Formula 4

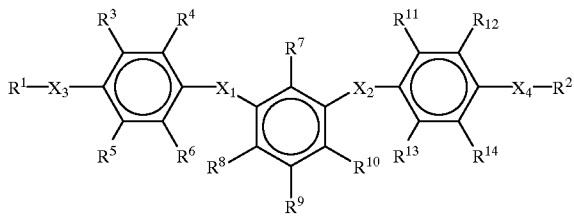

In the structural formula 4, R$^1$ and R$^2$ are each independently a hydrocarbon group having 1 to 20 carbon atoms, R$^3$ to R$^{14}$ are each independently a hydrogen atom, F, Cl, Br, C$_{1-6}$ hydrocarbon group or alkoxy group, X$_1$ and X$_2$ are each independently a single bond or at least one organic group selected from group A, X$_3$ and X$_4$ are each independently a single bond or an organic group selected from —O— and —O—(C=O)—, provided in the organic groups of X$_1$, X$_2$, X$_3$ and X$_4$ there also is included a structural formula with valences being reversed right and left.

<Group A>

—O—, —(C=O)—, —O—(C=O)—, —NR$_1$—(C=O)—,
—CR$_1$=CR$_1$—, —NR$_1$—(C=O)—CR$_1$=CR$_1$—,
—O—(C=O)—CR$_1$=CR$_1$—,
—(CR$_2$)$_n$—(n=1~4)

—O—(CR$_2$)$_n$—O—(n=1~4)
—(CR$_2$)$_n$—O—CH$_2$—(n=1, 2),
—O—(CR$_2$)$_n$—(n=1~3),
—O—(C=O)—(CR$_2$)$_n$—(n=1~2),
—(CR$_2$)$_n$—O—(C=O)—(n=1~2), where R$_1$ and R$_2$ are each independently a hydrogen atom or a hydrocarbon group having 1 to 10 carbon atoms, provided R$_1$s need not be the same, and if there are n number of R$_2$s, the. R$_2$s may be mutually different.

Structural Formula 5

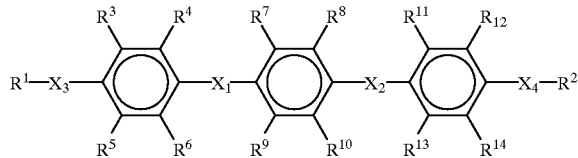

In the structural formula 5, R$^1$ and R$^2$ are each independently a hydrocarbon group having 1 to 20 carbon atoms, R$^3$ to R$^{14}$ are each independently a hydrogen atom, F, Cl, Br, C$_{1-6}$ hydrocarbon group or alkoxy group, X$_1$ and X$_2$ are each independently a single bond or at least one organic group selected from group A, and X$_3$ and X$_4$ are each independently a single bond or an organic group selected from —O— and —O—(C=O)—, provided in the organic groups of X$_1$, X$_2$, X$_3$ and X$_4$ there also is included a structural formula with valences being reversed right and left.

<Group A>
—O—, —(C=O)—, —O—(C=O)—, —NR$_1$—(C=O)—,
CR$_1$=CR$_1$—, —NR$_1$—(C=O)—CR$_1$=CR$_1$—,
—O—(C=O)—CR$_1$=CR$_1$—,
—(CR$_2$)$_n$—(n=1~4),
—O—(CR$_2$)$_n$—O—(n=1~4),
—(CR$_2$)$_n$—O—CH$_2$—(n=1, 2),
—O—(CR$_2$)$_n$—(n=1~3),
—O—(C=O)—(CR$_2$)$_n$—(n=1~2),
—(CR$_2$)$_n$—O—(C=O)—(n=1~2), where R$_1$ and R$_2$ are each independently a hydrogen atom or a hydrocarbon group having 1 to 10 carbon atoms, provided R$_1$s need not be the same, and if there are n number of R$_2$s, the R$_2$s may be mutually different.

Structural Formula 6

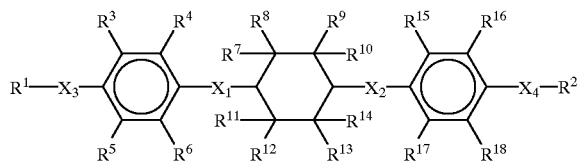

In the structural formula 6, R$^1$ and R$^2$ are each independently a hydrocarbon group having 1 to 20 carbon atoms, R$^3$ to R$^{18}$ are each independently a hydrogen atom, F, Cl, Br, C$_{1-6}$ hydrocarbon group or alkoxy group, X$_1$ and X$_2$ are each independently a single bond or at least one organic group selected from group A, and X$_3$ and X$_4$ are each independently a single bond or an organic group selected from —O— and —O—(C=O), provided in the organic groups of X$_1$, X$_2$, X$_3$ and X$_4$ there also is included a structural formula with valences being reversed right and left.

<Group A>—O—, —(C=O)—, —O—(C=O)—, —NR$_1$—(C=O)—,
—CR$_1$=CR$_1$—, —NR$_1$—(C=O)—CR$_1$=CR$_1$—,
—O—(C=O)—CR$_1$=CR$_1$—,
—(CR$_2$)$_n$—(n=1~4),
—O—(CR$_2$)$_n$—O—(n=1~4),
—(CR$_2$)$_n$—O—CH$_2$—(n=1, 2),
—O—(CR$_2$)$_n$—(n=1~3),
—O—(C=O)—(CR$_2$)$_n$—(n=1~2),
—(CR$_2$)—O—(C=O)—(n=1~2), where R$_1$ and R$_2$ are each independently a hydrogen atom or a hydrocarbon group having 1 to 10 carbon atoms, provided R$_1$s need not be the same, and if there are n number of R$_2$, the R$_2$s may be mutually different.

Structural Formula 7

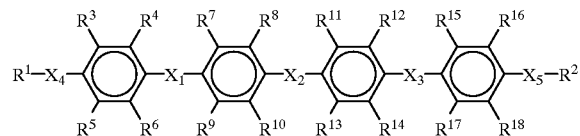

In the structural formula 7, R$^1$ and R$^2$ are each independently a hydrocarbon group having 1 to 20 carbon atoms, R$^3$ to R$^{18}$ are each independently a hydrogen atom, F, Cl, Br, C$_{1-6}$ hydrocarbon group or alkoxy group, X$_1$, X$_2$ and X$_3$ are each independently a single bond or at least one organic group selected from group A, and X$_4$ and X$_5$ are each independently a single bond or an organic group selected from —O— and —O—(C=O)—, provided in the organic groups of X$_1$, X$_2$, X$_3$, X$_4$ and X$_5$ there also is included a structural formula with valences being reversed right and left.

<Group A>
—O—(C=O)—, —O—(C=O)—, —NR$_1$—(C=O)—,
—CR$_1$=CR$_1$—, —NR$_1$—(C=O)—CR$_1$=CR$_1$,
—O—(C=O)—CR$_1$=CR$_1$—,
—(CR$_2$)$_n$—(n=1~4),
—O—(CR$_2$)$_n$—O—(n=1~4),
—(CR$_2$)$_n$—O—CH$_2$—(n=1, 2),
—O—(CR$_2$)$_n$—(n=1~3),
—O—(C=O)—(CR$_2$)$_n$—(n=1~2),
—(CR$_2$)$_n$—O—(C=O)—(n=1~2), where R$_1$ and R$_2$ are each independently a hydrogen atom or a hydrocarbon group having 1 to 10 carbon atoms, provided R$^1$s need not be the same, and if there are n number of R$_2$s, the R$_2$s may be mutually different.

Structural Formula 8

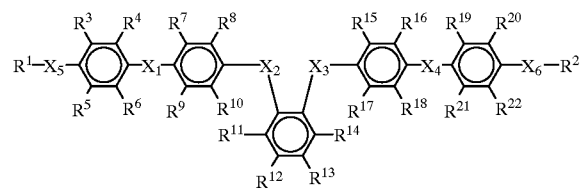

In the structural formula 6, R$^1$ and R$^2$ are each independently a hydrocarbon group having 1 to 20 carbon atoms, R$^3$ to $R_{22}$ are each independently a hydrogen atom, F, Cl, Br, $C_{1-6}$ hydrocarbon group or alkoxy group, $X_1$, $X_2$, $X_3$, and $X_4$ are each independently a single bond or at least one organic group selected from group A, and $X_5$ and $X_6$ are each independently a single bond or an organic group selected from —O— and —O—(C=O), provided in the organic groups of $X_1$, $X_2$, $X_3$, $X_4$, $X_5$ and $X_6$ there also is included a structural formula with valences being reversed right and left.

<Group A>

—O—, —(C=O)—, —O—(C=O)—, —$NR_1$—(C=O)—,

—$CR_1$=$CR_1$—, —$NR_1$—(C=O)—$CR_1$=$CR_1$—,

—O—(C=O)—$CR_1$=$CR_1$—,

—$(CR_2)_n$— (n=1~4),

—O—$(CR_2)_n$—O— (n=1~4),

—$(CR_2)_n$—O—$CH_2$— (n=1, 2),

—O—$(CR_2)_n$— (n=1~3),

—O—(C=O)—$(CR_2)_n$— (n=1~2),

—$(CR_2)_n$—O—(C=O)— (n=1~2), where $R_1$ and $R_2$ are each independently a hydrogen atom or a hydrocarbon group having 1 to 10 carbon atoms, provided $R^1$s need not be the same, and if there are n number of $R_2$s, the $R_2$s may be mutually different.

Structural Formula 9

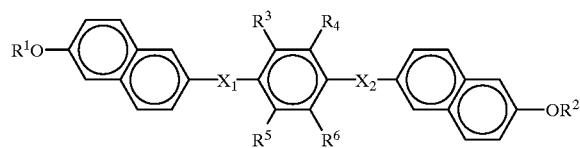

In the structural formula 9, $R^1$ and $R^2$ are each independently a hydrocarbon group having 1 to 20 carbon atoms, $R_3$ to $R^6$ are each independently a hydrogen atom, F, Cl, Br, $C_{1-6}$ hydrocarbon group or alkoxy group, $X_1$ and $X_2$ are each independently a single bond or an organic group selected from —O— and —O—(C=O)—, provided in the organic groups of $X_1$ and $X_2$ there also is included a structural formula with valences being reversed right and left.

Structural Formula 10

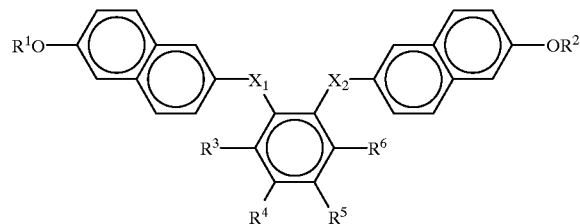

In the structural formula 10, $R^1$ and $R^2$ are each independently a hydrocarbon group having 1 to 20 carbon atoms, $R^3$ to $R^6$ are each independently a hydrogen atom, F, Cl, Br, $C_{1-6}$ hydrocarbon group or alkoxy group, and $X_1$ and $X_2$ are each independently a single bond or an organic group selected from —O— and —O—(C=O)—, provided in the organic groups of $X_1$ and $X_2$ there also is included a structural formula with valences being reversed right and left.

Structural Formula 11

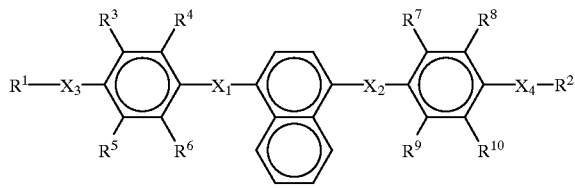

In the structural formula 11, $R^1$ and $R^2$ are each independently a hydrocarbon group having 1 to 20 carbon atoms, $R^3$ to $R^{10}$ are each independently a hydrogen atom, F, Cl, Br, $C_{1-6}$ hydrocarbon group or alkoxy group, $X_1$ and $X_2$ are each independently a single bond or at least one organic group selected from group A, and $X_3$ and $X_4$ are each independently a single bond or an organic group selected from —O— and —O—(C=O), provided in the organic groups of $X_1$, $X_2$, $X_3$ and $X_4$ there also is included a structural formula with valences being reversed right and left.

<Group A>

—O—, —(C=O)—, —O—(C=O)—, —$NR_1$—(C=O)—,

—$CR_1$=$CR_1$—, —$NR_1$—(C=O)—$CR_1$=$CR_1$—,

—O—(C=O)—$CR_1$=$CR_1$—,

—$(CR_2)_n$— (n=1~4)

—O—$(CR_2)_n$—O— (n=1~4),

—$(CR_2)_n$—O—$CH_2$— (n=1, 2),

—O—$(CR_2)_n$— (n=1~3),

—O—(C=O)—$(CR_2)_n$— (n=1~2),

—$(CR_2)_n$—O—(C=O)— (n=1~2), where $R_1$ and $R_2$ are each independently a hydrogen atom or a hydrocarbon group having 1 to 10 carbon atoms, provided $R_1$s need not be the same, and there are n number of $R_2$s, the $R_2$s may be mutually different.

Regarding how to prepare the compounds of the above structures, there is no special limitation. There may be adopted any method known in the field concerned. The compounds in question need not be pure compounds. For example, they may be used without removing impurities by produced during synthesis insofar as there is no obstacle to formation or use of the film of the invention such as deterioration of orientability or colorization. Further, plural such compounds may be used as a mixture.

Any of the compounds represented by the general formula (1) is used in an amount of 0.1 to 20 wt %, preferably 0.3 to 10 wt %, relative to the liquid crystalline polymer described previously. If its amount is smaller than 0.1 wt %, it may be impossible to obtain a uniform orientation, while if it is larger than 20 wt %, a bad influence may result in a reliability test such as a heat resistance test.

In the present invention, a liquid crystalline composition comprising the liquid crystalline polymer exhibiting an optically positive uniaxial property and the compound of the general formula (1) is oriented preferably in a nematic hybrid orientation form uniformly on an orienting substrate and in the state of liquid crystal, which orientation is then fixed, to prepare a film for optical elements. To this end, it is desirable to use the following orienting substrate and go through the following steps.

Generally, for obtaining a nematic hybrid orientation with use of a liquid crystalline composition, it is desirable that a layer of the said liquid crystalline composition be sandwiched vertically in between different interfaces. In this case, if the upper and lower interfaces are the same, the same orientation will result at the upper and lower interfaces, thus making it difficult to obtain a nematic hybrid orientation.

According to a concrete method for forming the film of the invention, a single orienting substrate and an air interface are utilized, and lower and upper interfaces of a layer of the liquid crystalline composition are brought into contact with an orienting substrate and air, respectively. It is also possible to use upper and lower orienting substrates of different interfaces, but from the standpoint of a manufacturing process it is desirable to use one orienting substrate and an air interface.

It is preferable for orienting substrates employable in the invention to possess anisotropy so that they can define a tilt direction of the liquid crystal molecules (the projection of directors to the orienting substrate). If the orienting substrates cannot define a tilt direction of liquid crystal at all, there will be obtained only such an orientation form as tilts in disorderly directions (disorderly vectors as director projections to the substrate).

As examples of orienting substrates employable in the present invention there are mentioned film substrates and uniaxially stretched film substrates both formed using such plastic materials as polyimides, polyamide-imides, polyamides, polyether imides, polyether ether ketones, polyether ketones, polyketone sulfides, polyether sulfones, polysulfones, polyphenylene sulfides, polyphenylene oxides, polyethylene terephthalates, polybutylene terephthalates, polyethylene naphthalates, polyacetals, polycarbonates, polyacrylates, acrylic resins, polyvinyl alcohols, polypropylenes, cellulosic plastics, epoxy resins, and phenolic resins, as well as metallic substrates such as aluminum, iron and copper substrates having slits in the surfaces thereof, and glass substrates such as alkali glass, borosilicate glass and flint glass substrates having slit-like etched surfaces.

In the present invention there may be used rubbed plastic film substrates obtained by rubbing the above plastic film substrates, as well as rubbed thin plastic films such as rubbed polyimide films and rubbed polyvinyl alcohol films. Further, the substrates exemplified above may have obliquely vapor-deposited films of silicon oxide.

Among the various orienting substrates exemplified above, preferred examples for forming the nematic hybrid orientation of the liquid crystalline composition are substrates each having a rubbed polyimide film, rubbed polyimide substrates, rubber polyether ether ketone substrates, rubbed polyether ketone substrates, rubbed polyether sulfone substrates, rubbed polyphenylene sulfide substrates, rubbed polyethylene terephthalate substrates, rubbed polyethylene naphthalate substrates, rubbed polyarylate substrates, and cellulosic plastic substrates.

In the case where the liquid crystalline composition in the film of the present invention forms a nematic hybrid orientation, the angle of director in the liquid crystalline composition to a film surface is different between the upper and lower surfaces of the film. At the substrate-side film surface the said angle can be adjusted to an angle in either the range of 0° to 200 or the range of 30° to 90° by suitably selecting an orienting method or the kind of the liquid crystalline composition to be used. From the standpoint of a manufacturing process it is usually desirable to adjust the director-film surface angle in the vicinity of the film interface contacting the orienting substrate to an angle in the range of 0° to 20°. In this case, the director-film surface angle in the vicinity of the film interface not in contact with the orienting substrate is adjusted to an angle in the range of 30° to 90°.

The film of the invention is obtained by applying the liquid crystalline composition uniformly onto the orienting substrate described above and then going through a uniformly orienting step and an orientation fixing step. The application of the liquid crystalline composition onto the orienting substrate can be done in a state of solution of the liquid crystalline composition dissolved in any of various solvents or in a melted state thereof. The former, solution coating, is preferred in the manufacturing process.

For the solution coating, first the liquid crystalline composition is dissolved in a solvent to prepare a solution having a predetermined concentration. The film thickness (the thickness of a layer formed by the liquid crystalline composition) is decided at the stage of applying the liquid crystalline composition onto the substrate and therefore it is necessary to control the concentration of the solution and the film thickness accurately.

What solvent is to be used cannot be said sweepingly because it depends on the kind (say composition ratio) of the liquid crystalline composition used, but examples of solvents employable include halogenated hydrocarbons such as chloroform, dichloromethane, carbon tetrachloride, dichloroethane, tetrachloroethane, trichloroethylene, tetrachloroethylene, chlorobenzene, and orthodichlorobenzene, phenols such as phenol and parachlorophenol, aromatic hydrocarbons such as benzene, toluene, xylene, methoxybenzene, and 1,2-dimethoxybenzene, as well as acetone, ethyl acetate, tert-butyl alcohol, glycerin, ethylene glycol, triethylene glycol, ethylene glycol monomethyl ether, diethylene glycol dimethyl ether, ethyl cellosolve, butyl cellosolve, 2-pyrrolidone, N-methyl-2-pyrrolidone, pyridine, triethylamine, tetrahydrofuran, dimethylformamide, dimethylacetamide, dimethyl sulfoxide, acetonitrile, butyronitrile, carbon disulfide, and mixtures thereof such as mixed solvents of halogenated hydrocarbons and phenols.

The concentration of the solution used depends on the solubility of the liquid crystalline composition used and the thickness of the film to be obtained, but is usually in the range of 3 to 50 wt %, preferably 5 to 30 wt %.

In the case of using a solvent having a high surface tension, a surface active agent may be added into the solution if necessary for performing the application of the solution stably. Any surface active agent may be used insofar as it can lower the surface tension of the solution and stabilize the film formed. But fluorine-based surfactants are particularly preferred. Suitable surfactants available commercially are employable such as Fluorad, (a product of 3M Co.), Paintadd (Dow Corning Co.), SURFLON (Asahi Glass Co.), Unidyne (Daikin Kogyo Co.), MEGAFAC (Dainippon Ink Co.), F-TOP (Shin Akita Kasei Co.), SOTERJET (NEOS Co.), ARON-G (Toa Gosei Co.), and Modiper (Nippon Oils & Fats Co.). No limitation is made to these surfactants, but it goes without saying that products of other companies having equal chemical structures are also employable.

The amount of the surfactant used is usually in the range of 0.001 to 1 g based on 1 kg of the solution. A larger amount than 1 g may result in the surfactant becoming a foreign matter in the liquid crystalline composition and causing a defect of the composition. There also is a fear that a longer time may be required for the formation of orientation or the orientation form of liquid crystal may be badly influenced, such as impairment of orientation.

After adjustment to a desired concentration with use of the solvent, the solution of the liquid crystalline composition is applied onto the orienting substrate described above. In this case there may be adopted a suitable coating method such as spin coating, roll coating, die coating, printing, dipping/pulling-up, or curtain coating.

After the coating the solvent is removed, allowing a layer of the liquid crystalline composition having a uniform thickness to be formed on the orienting substrate. How to remove the solvent is not specially limited. Any method may be adopted insofar as the solvent can mostly be removed and the layer of the liquid crystalline composition does not flow or drop. Usually the solvent is removed by drying at room temperature, drying in a drying oven, or by spraying of warm or hot air.

This coating and drying stage intends to form a uniform layer of the liquid crystalline composition on the substrate, with a liquid crystal orientation of the composition being not formed yet. A liquid crystal orientation of monodomain, preferably a nematic hybrid orientation, is completed by a heat treatment which follows.

In forming a nematic hybrid orientation by heat treatment, the lower the viscosity of the liquid crystalline composition, the better, for promoting the orientation induced by an interfacial effect. Therefore, the higher the heat treatment temperature, the more desirable. In certain liquid crystalline compositions, an average tilt angle, which will be described later, may differ depending on the heat treatment temperature. In this case, it is necessary to set a heat treatment temperature suitable for obtaining a desired average tilt angle. For example, when there occurs the necessity of performing the heat treatment at a relatively low temperature for obtaining an orientation of a certain tilt angle, the low temperature keeps the liquid crystalline composition high in viscosity, resulting in that the time required for orientation becomes longer. In such a case, it is effective to adopt a method wherein heat treatment is once conducted at a high temperature to afford a monodomain orientation and thereafter the heat treatment temperature is dropped to a desired level stepwise or gradually. Anyhow, it is desirable to perform the heat treatment at a temperature above the glass transition point of the liquid crystalline composition used in accordance with characteristics of the composition, more particularly, of the liquid crystalline polymer. In the case where two or more liquid crystalline polymers are used, it is desirable to set a suitable heat treatment temperature in accordance with the glass transition points of the polymers. More specifically, it is desirable that the heat treatment be carried out at a temperature higher than the glass transition point of the polymer which is the highest in the same point among the two or more liquid crystalline polymers.

The heat treatment temperature necessary for the formation of a liquid crystal orientation is usually in the range of 50° to 300° preferably 70° to 280° C., more preferably 100° to 260° C. As noted previously, there also may be adopted a continuous heat treatment involving plural temperatures, namely, a continuous heat treatment comprising a heat treatment at a certain temperature and subsequent heat treatment at a lower or higher temperature.

The heat treatment time necessary for the liquid crystalline composition to exhibit a satisfactory orientation on the orienting substrate depends on the kind (say, composition ratio) of the liquid crystalline composition used and the heat treatment temperature adopted, but is usually in the range of 10 seconds to 120 minutes, preferably 30 seconds to 60 minutes. If the heat treatment time shorter than 10 seconds, there is a fear that the orientation obtained may be unsatisfactory. Also, a longer time than 120 minutes is not desirable because the productivity may be deteriorated.

In this way, in the state of liquid crystal, it is possible to obtain a nematic hybrid orientation which is uniform throughout the whole surface of the orienting substrate.

A magnetic or electric field may be utilized in the above heat treatment. However, if a too strong magnetic or electric field is applied during heat treatment, a uniform field force will be exerted on the liquid crystalline composition during application of the field, so that the directors of the liquid crystal are apt to face in a certain direction. In other words, it becomes difficult to obtain such a nematic hybrid orientation as in the present invention wherein the directors define different angles at different positions in the film thickness direction.

The nematic hybrid orientation thus formed in the state of liquid crystal of the liquid crystalline composition can be fixed, without impairing the uniformity of the orientation, by cooling to a temperature below the liquid crystal transition point of the composition. Generally, in the case of using a liquid crystalline composition which has a smectic phase or a crystal phase in a lower temperature region than the nematic phase, the nematic orientation in the state of liquid crystal may be destroyed by cooling. The liquid crystalline composition used in the present invention possesses the following properties:

1̂ Does not have any smectic phase or crystal phase below the nematic phase temperature region.
2̂ Even if the liquid crystalline composition has a smectic or crystal phase latently, the smectic or crystal phase does not appear at the time of cooling.
3̂ In the working temperature range of the film for optical elements, the liquid crystalline composition does not exhibit fluidity nor any change in its orientation form even with an external field or force applied thereto.

Thus, there will not occur the destruction of the orientation form caused by a phase transition to the smectic phase or crystal phase, and a liquid crystal orientation, preferably a nematic hybrid orientation, of a completely monodomain can be fixed.

The foregoing cooling temperature is not specially limited if only it is below the liquid crystal transition point of the liquid crystalline composition used. For example, by cooling at a temperature 10° C. lower than the liquid crystal transition point, it is possible to fix a uniform liquid crystal orientation. Means for cooling is not specially limited. The orientation formed can be fixed by merely transferring the liquid crystalline composition from within the heating atmosphere in the heat treatment step into an atmosphere held at a temperature below the liquid crystal transition point of the composition, for example, into a room temperature atmosphere. For enhancing the production efficiency there may be adopted a forced cooling such as air or water cooling, or removal of heat. In certain liquid crystalline compositions, however, the average tilt angle obtained somewhat differs, depending on the cooling rate. When such a liquid crystalline composition is used and when there occurs the necessity of controlling the average tilt angle strictly, it is desirable that appropriate cooling conditions be established in carrying out the cooling operation.

The following description is now provided about controlling the angle in the film thickness direction of the nematic hybrid orientation. When the nematic hybrid orientation is fixed in the film of the invention, the absolute value of the composition director-film surface angle in the vicinity of the upper or lower interface of the film is in the range of one to 20° at one of the upper and lower surfaces of the film and is in the range of 30° to 90° at the opposite surface. Control can be made to a desired angle by selecting a suitable kind (say, composition ratio) of a liquid crystalline composition to be used. a suitable orienting substrate and suitable conditions for heat treatment. Even after fixing the nematic hybrid orientation, control can be made to a desired angle by adopting a suitable method such as a method of scraping the film surface uniformly or a method of dipping the film in a solvent to melt the film surface uniformly. In this case, it is necessary to select a suitable solvent according to the kind (say, composition ratio) of the liquid crystalline composition used and that of the orienting substrate used.

In the film of the invention obtained through the above steps, a uniform nematic hybrid orientation is fixed. Since the said orientation is formed, the upper and lower portions of the film are not equivalent to each other and anisotropy is found also in the intra-film surface direction. Thus, the film can be utilized as a viewing angle improving film for a liquid crystal display (LCD), and by disposing the film in an LCD it is possible to derive various characteristics.

A more detailed description will be given below about a method of using the film of the invention as a viewing angle improving film.

In the case of disposing a viewing angle improving film in a twisted nematic type liquid crystal cell, the film can be used in any of the following modes of use:
1̂ The orienting substrate is peeled from the film and the film is used alone as a viewing angle improving film.
2̂ The film formed on the orienting substrate is used as it is.
2̂ The film as a viewing angle improving film is laminated onto another substrate different from the orienting substrate and is used.

In the case of using the viewing angle improving film alone, the film alone can be obtained by, for example, any of a method in which the orienting substrate is peeled off at the interface with the viewing angle improving film mechanically using a roll or the like, a method in which the film and the orienting substrate are dipped in a solvent which is a poor solvent for all of the constituent materials and thereafter the orienting substrate is peeled off mechanically, a method in which the orienting substrate is peeled off by the application of ultrasonic wave thereto, a method in which a temperature change is induced by utilizing the difference in thermal expansion coefficient between the orienting substrate and the film, and a method in which the orienting substrate itself or an alignment layer thereon is dissolved off. Since releasability differs depending on the kind of the liquid crystalline composition used and the adhesion thereof to the orienting substrate, there should be adopted a method most suitable for the system concerned. In the case of using the viewing angle improving film alone, a certain film thickness does not afford a self-supporting property of the film. In such a case, for ensuring the strength and reliability of the film, it is desirable that the film be fixed through an adhesive or a pressure-sensitive adhesive onto a substrate which is preferred in point of optical properties, such as a plastic substrate, examples of which are polymethacrylates, polycarbonates, polyvinyl alcohols, polyether sulfones, polysulfones, polyacrylates, polyimides, amorphous polyolefins, and triacetyl cellulose.

A description will now be given of the case where the viewing angle improving film is used as it is formed on the orienting substrate. If the orienting substrate is optically isotropic or if it is required for a TN-LCD (twisted nematic liquid crystal display), the film on the substrate can be incorporated into the TN-LCD as it is as a desired compensating element.

A description will now be given of the case where the viewing angle improving film of the invention obtained by fixing the orientation of the liquid crystalline composition on the orienting substrate is peeled from the substrate and is then laminated onto another substrate more suitable for optical use. In this case, the viewing angle improving film of the invention can be incorporated into a TN-LCD as a compensating laminate constituted at least by the film and the another substrate different from the orienting substrate. For example, when the orienting substrate used exerts an undesirable influence on a TN-LCD although it is necessary for obtaining a nematic hybrid orientation, the said substrate can be removed from the viewing angle improving film after fixing the orientation. More specifically, it is possible to adopt te following method.

A substrate ("the second substrate" hereinafter) suitable for a liquid crystal display to be installed into a TN-LCD and the viewing angle improving film on the orienting substrate are affixed together using, for example, an adhesive or a pressure-sensitive adhesive. Then, the orienting substrate is peeled off at the interface with the viewing angle improving film, allowing the film to be transferred onto the second substrate side suitable for the liquid crystal display, to afford a compensating element.

As to the second substrate to be used for the transfer, no special limitation is placed thereon if only it has a moderate flatness, but glass substrates and transparent plastic films having an optical isotropy are preferred. As examples of such plastic films are mentioned films of polymethyl methacrylates, polystyrenes, polycarbonates, polyester sulfones, polyphenylene sulfides. polyacrylates, amorphous polyolefins, triacetyl cellulose, and epoxy resins. Above all, polymethyl methacrylates, polycarbonates, polyacrylates, polyether sulfones, and triacetyl cellulose are preferred. Even optically anisotropic films are employable if they are required for the TN-LCD concerned. As examples of optically anisotropic films are mentioned retardation films obtained by stretching plastic films such as polycarbonate and polystyrene films, as well as polarizing films.

As an example of the second substrate there is mentioned a liquid crystal cell itself. The liquid crystal cell uses two upper and lower glass or plastic substrates with electrodes. If the viewing angle improving film of the present invention is transferred onto one or both of the upper and lower glass or plastic substrates, it follows that the incorporation of the film has been completed. Of course, the viewing angle improving film of the present invention can also be fabricated using as an orienting substrate a glass or plastic substrate itself which is a constituent of the liquid crystal cell.

It is not necessary for the second substrate to substantially have an orientation controlling ability for the liquid crystalline composition, nor is it necessary to form an alignment layer or the like between the second substrate and the film.

As to the adhesive or pressure-sensitive adhesive for affixing the second substrate used for the transfer and the viewing angle improving film of the invention to each other, there is no special limitation if only it is of an optical grade. For example, there may be used any of acrylic, epoxy-, ethylene/vinyl acetate copolymer-, rubber- and urethane-based adhesives and pressure-sensitive adhesives, as well as mixtures thereof. As the adhesive there may be used any of thermosetting, photo-setting, and electron beam-curable type adhesives insofar as they are optically isotropic.

The transfer of the viewing angle improving film of the present invention onto the second substrate suitable for a liquid crystal display can be accomplished by peeling off the orienting substrate at the interface with the film after the bonding. As examples of peeling methods, though referred to previously, there are mentioned a mechanical peeling method using a roll or the like, a method involving dipping in a solvent which is a poor solvent for all of the constituent materials and a subsequent mechanical removal of the orienting substrate, a peeling method using ultrasonic wave in a poor solvent, a peeling method using a temperature change based on the difference between the orienting substrate and the film, and a method of dissolving off the orienting substrate itself or the alignment layer thereon. There should be adopted a method most suitable for the system concerned because releasability differs depending on the kind of the liquid crystalline composition used and the adhesion thereof to the orienting substrate.

The viewing angle improving film of the invention may be coated with a protective layer such as a transparent plastic film for the purpose of protecting the surface, enhancing the strength and improving the environmental reliability.

The viewing angle improving film thus obtained exhibits an excellent viewing angle compensating effect for TN-LCDs. The thickness of the film required to exhibit a more suitable compensating effect for various TN-LCDs cannot be said sweepingly because it depend on the type of the TN-LCD concerned and various optical parameters. But it is usually in the range of 0.1 to 20 μm, preferably 0.2 to 10 μm, more preferably 0.3 to 5 μm. If the film thickness is smaller than 0.1 μm, a satisfactory compensating effect may not be obtained, and if it exceeds 20 μm, the display may be colorized unnecessarily.

However, for deriving the performance of the viewing angle improving film to a higher extent, it is desirable that a more detailed consideration be given to optical parameters and axial configuration of the film.

A more detailed description will be given below.

Reference will be made first to an intra-film surface apparent retardation value obtained when the viewing angle improving film is seen in the normal line direction thereof. In the film which is In a state of nematic hybrid orientation, the refractive index ("ne" hereinafter) in a direction parallel to directors and the refractive index "no" hereinafter) in a direction perpendicular to directors are different from each other. Assuming that the value obtained by subtracting no from ne is an apparent birefringence, an apparent retardation value is given as the product of apparent birefringence and absolute film thickness. This apparent retardation value can be obtained by polarimetry such as ellipsometry. Apparent retardation value in the viewing angle improving film of the invention is usually in the range of 5 to 500 nm, preferably 10 to 300 nm, more preferably 15 to 150 nm. If the apparent retardation value is smaller than 5 nm, there substantially is no difference from homeotropic orientation and a satisfactory viewing angle widening effect may not be obtained. If it is larger than 500 nm, there may occur an unnecessary colorization in the liquid crystal display when the film is seen obliquely.

The following description is now provided about the angle of director.

In the thickness direction of the viewing angle improving film with nematic hybrid orientation fixed, the angle of director is usually in the range of 30° to 90° at one of the upper and lower surfaces of the film in terms of an acute-side angle between director in the liquid crystalline polymer at a film interface and a projection component of the director to the film interface. On the opposite surface side the angle in question is usually in the range of 0° to 20°, preferably 40° to 90° as an absolute value of one angle, 0° to 10° as an absolute value of the other angle.

Now, an average tilt angle will be described below.

In the present invention, an average value in the film thickness direction of angles between directors of the liquid crystalline polymer and projection components of the directors to the substrate surface is defined to be an average tilt angle. The average tilt angle can be determined by the application of a crystal rotation method. The average tilt angle of the viewing angle improving film of the invention is usually in the range of 10° to 60°, preferably 20° to 50°. If the average tilt angle is smaller than 10° or larger than 60°, it may be impossible to obtain a satisfactory viewing angle widening effect although a certain degree of a viewing angle widening effect will be obtained.

A concrete description will now be given about in what position the viewing angle improving film is to be disposed when the film is to be used for widening the viewing angle of a TN-LCD. One or plural such films may be disposed between a polarizing plate and a liquid crystal cell. In the present invention it is desirable from the standpoint of practical use that one or two such films be used for compensation purpose. The use of three or more such films cannot be said so desirable because it leads to an increase of cost although it will be possible to effect compensation. Reference will be made below to concrete positions where the film is to be disposed, which positions, however, are typical examples, with no limitation made thereto.

First, upper and lower surfaces of the viewing angle improving film are defined as follows.

The film surface at which the angle between director in the liquid crystalline polymer exhibiting an optically uniaxial property and the film surface is in the range of 30° to 90° on an acute angle side, is assumed to be surface b, while the film surface at which the said angle is in the range of 0° to 20° on an acute angle side, is assumed to be surface c.

Next, the tilt direction of the viewing angle improving film is defined as follows.

When the surface c of the film is seen from the surface b through the liquid crystal layer, the direction in which the angle between director and a projection component of the director to the surface c is acute and which is parallel to the projection component, is defined to be the tilt direction.

A pretilt direction of a liquid crystal cell is defined as follows. A driving low-molecular liquid crystal is usually not parallel to a liquid crystal cell interface but tilts at a certain angle, which angle is defined to be a pretilt angle. The direction in which the angle between director of the liquid crystal at a cell interface and a projection component of the director to the interface is acute and which is parallel to the projection component of the direction, is defined to be a pretilt direction.

The following description is now provided about incorporating a single viewing angle improving film of the invention into a TN-LCD on the basis of the above definitions. The film is disposed between a polarizing plate and a liquid crystal cell. It is optional whether the film is to be located on the upper surface side or the lower surface side of the cell. In disposing the film, it is desirable that the tilt direction of the film and the pretilt direction at the liquid crystal cell interface not adjacent to the film is substantially coincident with each other. The angle between the tilt direction and the pretilt direction is, as an absolute value, usually in the range of 0° to 15°, preferably 0° to 10°, more preferably 0° to 5°. If the said angle is larger than 15°, it may be impossible to obtain a satisfactory viewing angle compensating effect.

Reference will now be made to the case where two viewing angle improving films are used in a TN-LCD.

The two films are disposed on the upper surface and/or the lower surface of a liquid crystal cell located between a pair of upper and lower polarizing plates. It is optional whether the two films are to be located on the same side or respectively on the upper and lower sides. It is also optional whether the two films are of the same parameters or of different parameters.

In the case where two viewing angle improving films are disposed respectively in upper and lower positions of a liquid crystal cell, it is desirable to dispose them in the same condition as in the case of using only one such film which has been referred to above. That is, it is desirable that in each of the two films the tilt direction of the liquid crystalline composition and the pretilt direction of the cell liquid crystal at the cell interface not adjacent to the film are substantially coincident with each other. The angle between the tilt direction and the pretilt direction is, as an absolute value, usually in the range of 0° to 15°, preferably 0° to 10°, more preferably 0° to 5°.

In the case where two viewing angle improving films are disposed on either the upper or the lower surface of a liquid crystal cell, the film located closer to the cell is disposed in the same condition as in the case of using one such film. That is, it is desirable that the tilt direction of the one film and the pretilt direction of nematic liquid crystal at the cell interface not adjacent to the film are substantially coincident with each other. The angle between the tilt direction and the pretilt direction is, as an absolute value, usually in the range of 0° to 15°, preferably 0° to 10°, more preferably 0° to 5°, The other film is disposed between the one film and a polarizing plate. In this case, it is desirable to dispose the other film so that the pretilt direction of nematic liquid crystal at the liquid crystal cell interface adjacent to the one first and the tilt direction of the other film are substantially coincident with each other.

Since the viewing angle improving film of the invention has a nematic hybrid orientation, its upper and lower portions are not equivalent to each other. Therefore, when the film is loaded into the liquid crystal cell, a slight difference is recognized in the viewing angle improving effect, depending on which side of the film is located closer to the cell. More preferably, the film is actually loaded into a TN-LCD in such a manner that a surface of the film where the angle between director in the liquid crystalline polymer and the film surface is larger (the surface where the said angle is in the range of 30° to 90°), is located closer to the liquid crystal cell and remote from a polarizing plate.

Reference will be made lastly to the arrangement of polarizing plates. Usually, in TN-LCD, upper and lower polarizing plates are disposed so that the respective transmission axes are orthogonal or parallel to each other.

Where the transmission axes of upper and lower polarizing plates are orthogonal to each other, both polarizing plates are disposed so that the transmission axis of each polarizing plate and the rubbing direction of the liquid crystal cell closes to the polarizing plate are orthogonal or parallel to each other or at an angle of 45°. Where a polarizing plate is disposed above the viewing angle improving film of the invention, the viewing angle improving effect will be obtained no matter in which of the above arrangements the polarizing plate may be. But it is most desirable to dispose upper and lower polarizing plates so that their transmission axes are orthogonal to each other. As to the relation between the transmission axis of a polarizing plate and the rubbing direction of the liquid crystal cell on the side closer to the polarizing plate, both parallel and perpendicular relations will do although there will be a slight difference in the viewing angle improving effect.

The viewing angle improving film of the present invention is greatly effective in improving the viewing angle of TN-LCDs using TFT or MIM elements and is also effective in improving the viewing angle and color compensation of other modes of LCDs such as STN (Super Twisted Nematic)-LCD, ECB (Electrically Controlled Birefringence)-LCD, OMI (Optical Mode Interference)-LCD, OCB (Optically Compensated Birefringence)-LCD, HAN (Hyrid Aligned Nematic)-LCD, and IPS (In Plane Switching)-LCD.

As described above, the film for optical elements according to the present invention fully satisfies reliability requirements such as high resistance to heat, to moisture and to light. Its strength is also high. Further, a wide range of conditions can be adopted for the orienting treatment, and the film, with little irregularity and few orientation defects, can be obtained industrially. Thus, its industrial application value is extremely high.

EXAMPLES

Examples will be described below, but it is to be understood that the invention is not limited thereto. The following analyzing methods were adopted in the Examples.
(1) Determining the Composition of a Liquid Crystalline Polymer and the Structure of a Compound A liquid crystalline polymer was dissolved in deuterated chloroform or deuterated trifluoroacetic acid and the composition thereof was determined by $^1$H-NMR of 400 MHz (JNM-GX400, a product of Japan Electron Optics Laboratory Co., Ltd.)
(2) Determining an Inherent Viscosity Using a Ubbelohde's viscometer, an inherent viscosity was determined in a mixed phenol/tetrachloroethane (60/40 weight ratio) solvent at 30° C.
(3) Determining a Liquid Crystal Phase Series Determined using a DSC (Perkin Elmer DSC-7) and by observation through an optical microscope (a polarizing microscope BH2, a product of Olympus Optical Co., Ltd.).
(4) Refractive Index Determined using an Abbe's refractometer (Type-4, a product of Atago K.K.).
(5) Polarization Analysis Conducted using an ellipsometer DVA-36VWLD (a product of Mizoshiri Kogaku Kogyo K.K.).
(6) Film Thickness Measured using SURFACE TEXTURE ANALYSIS SYSTEM Dektak 3030ST (a product of SLOAN). There also was adopted a method of determining the film thickness by interference wave measurement (an ultraviolet, visible, near infrared spectrophotometer V-570, a product of Nippon Bunko K.K.) and on the basis of refractive index data.

Reference Example 1

Using 40 mmols of terephthalic acid, 40 mmols of 2,6-naphthalenedicarboxylic acid, 80 mmols of catechol diacetate, and 80 mmols of acetoxybenzoic acid, polymerization was carried out in a nitrogen atmosphere at 260° C. for 4 hours, at 290° C. for 2 hours, and then at 290° C. for 4 hours in a current of nitrogen gas fed at a rate of 100 ml/min, to afford a liquid crystalline polyester (formula 1). This liquid crystalline polyester had an inherent viscosity of 0.16, had a nematic phase as a crystal phase, and had an isotropic phase—liquid crystal phase transition temperature of not lower than 300° C. and a glass transition point of 120° C.

Using this liquid crystalline polyester, there was prepared a 10 wt % solution thereof in a mixed phenol/tetrachloroethane solution (6/4 weight ratio) solvent. This solution was then applied onto a soda glass plate in accordance with a bar coating method, then dried, heat-treated at 190° C. for 30 minutes, and thereafter cooled at room temperature to fix the resulting orientation. As a result, there was obtained a liquid crystalline film having a thickness of 1 μm. By observation of the film under a polarizing microscope there was found out a portion where a discrimination line was present despite of the same quenching axes of adjacent domains, and thus the orientation obtained was found to be a tilt orientation.

Formula 1

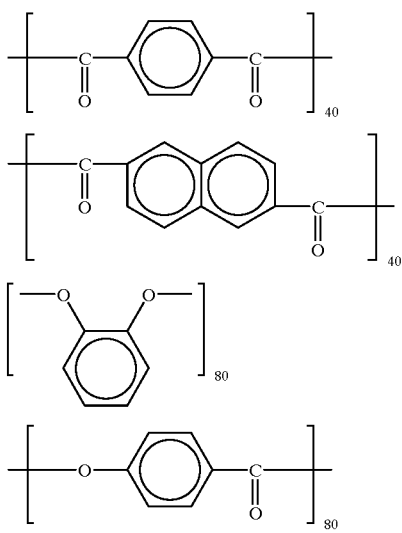

Reference Example 2

Using 10 mmols of 4-octyloxybenzoic acid, 50 mmols of terephthalic acid, 45 mmols of naphthalenedicarboxylic acid, 50 mmols of catechol diacetate, 50 mmols of 3-methylcatechol diacetate, and 50 mmols of 4-acetoxybenzoic acid, a deacetylation polymerization was carried out in a nitrogen atmosphere at 270° for 4 hours, and then at the same temperature for 2 hours in a current of nitrogen gas fed at a rate of 30 ml/min. The resulting reaction product was then dissolved in tetrachloroethane and thereafter purified by reprecipitation with methanol to afford a liquid crystalline polyester (formula 2). This liquid crystalline polyester had an inherent viscosity of 0.10, had a nematic phase as a liquid crystal phase, and had an isotropic phase-liquid crystal phase transition temperature of 240° C. and a glass transition point of 75° C.

Using the liquid crystalline polyester, there was prepared a 10 wt % solution thereof in a mixed phenol/tetrachloroethane (6/4 weight ratio) solvent. The solution was then applied onto a soda glass plate by a spin coaing method, then dried, heat-treated at 220° C. for 30 minutes, and thereafter cooled at room temperature to fix the resulting orientation. As a result of conoscope observation of the film, the film was found to have a homeotropic orientation.

Formula 2

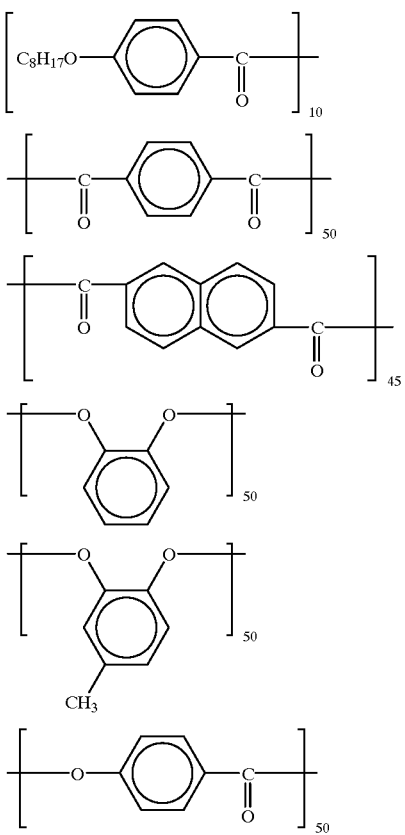

Reference Example 3

10 mmols of tert-butylhydroquinone diacetate and 20 mmols of 1,6-pentyloxy-2-naphthoic acid were reacted in a nitrogen atmosphere at 250° C. for 4 hours, at 270° C. for 2 hours, and then at 27° C. for 2 hours in a current of nitrogen gas fed at a rate of 30 ml/min. Subsequent recrystallization of the resulting reaction product from a mixed methanol/ethyl acetate (1/1) solvent afforded the compound of formula (3).

Formula 3

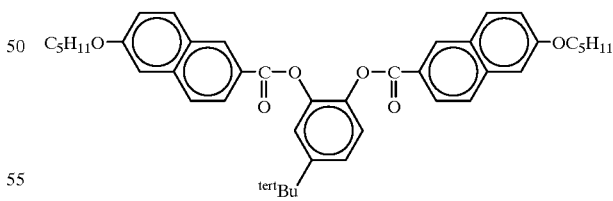

Example 1

75 parts of the liquid crystalline polyester (formula 1), 20 parts of the liquid crystalline polyester (formula 2), and 5 parts of the compound (formula 3), prepared in the above reference examples, were mixed together to afford a liquid crystalline composition. Then, there was prepared an 8 wt % solution of the said composition in tetrachloroethane. This solution was then applied onto a glass substrate having a rubbed polyimide film by a spin coating method, then dried, heat-treated at 220° C. for 20 minutes, and thereafter cooled with air, to afford film 1. The film 1 on the glass substrate was a uniform, transparent film free of any orientation defect and having a thickness of 1.55 μm.

Figure 2:
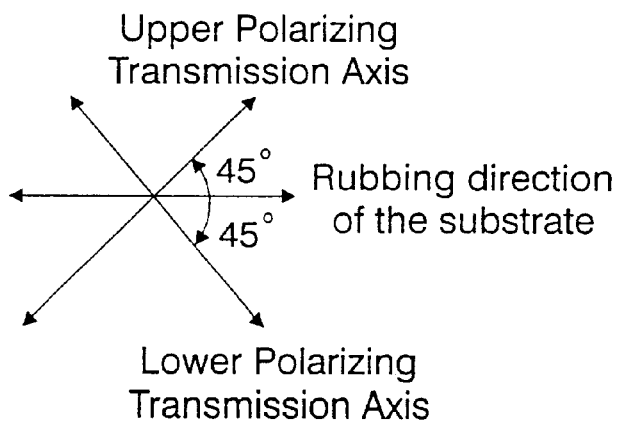
FIG. 2 is a diagram showing a relation of axis directions between a sample and polarizing plates in the optical measurement system used in the tilt angle measurement for the film of the invention.
Figure 3:
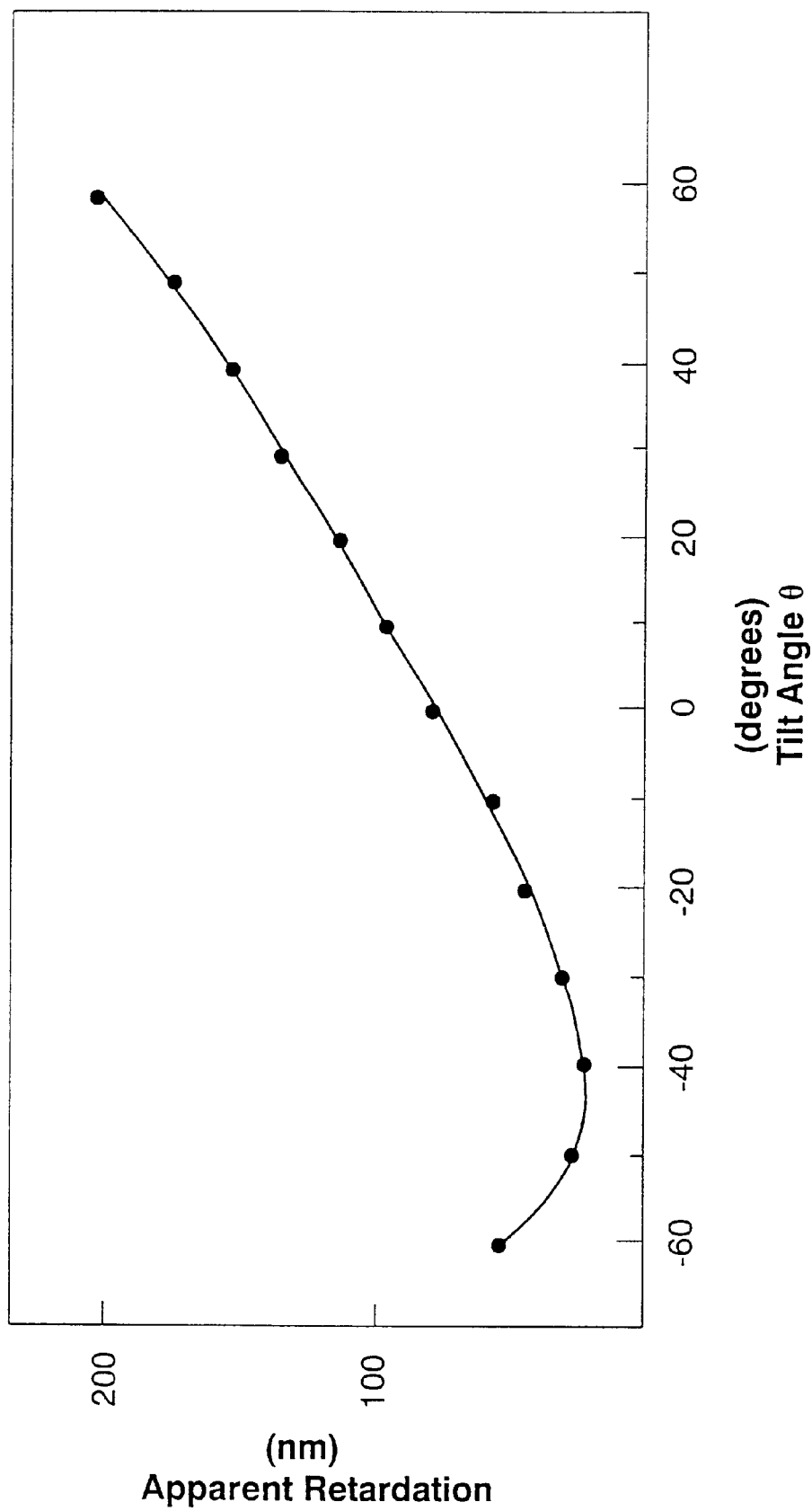
FIG. 3 is a diagram showing a relation between apparent retardation values as measured in a tilted state along a substrate rubbing direction and tilt angles of a sample (film 1) in Example 1.

Then, using an optical measurement system shown in FIGS. 1 and 2, a retardation value of the film was measured while the film was tilted in the rubbing direction of the substrate. The result proved to be asymmetric right and left as in FIG. 3 and include no angle corresponding to a retardation value of zero. From this result it turned out that the directors of the liquid crystalline polyesters tilted with respect to the substrate and that the orientation obtained was not a uniform tilt orientation (a state of orientation in which the director-substrate surface angle is constant in the film thickness direction).

Figure 4:
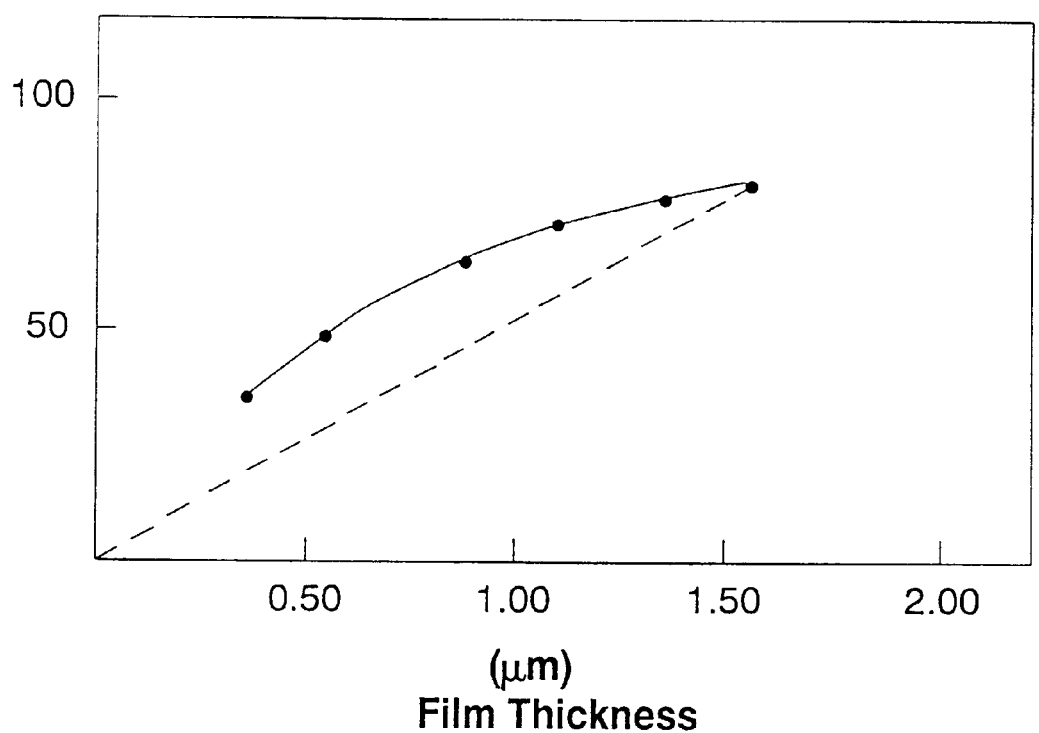
FIG. 4 is a diagram showing the results of having measured thicknesses after immersion of film 1 and apparent retardation values on the front side of the sample in Example 1.

The film 1 on the substrate was cut into five divided films, each of which was then dipped in a methanol solution containing 3 wt % of chloroform for a predetermined certain time, allowing elution to take place from the upper surface of the liquid crystal layer. When the films were dipped for 15 seconds, 30 seconds, 1 minute, 2 minute and 5 minutes, respectively, the thicknesses of their liquid crystal layers left uneluted were 1.35 μm, 1.10 μm, 0.88 μm, 0.56 μm, and 0.37 μm, respectively. Using the optical system shown in FIGS. 1 and 2, retardation values (front retardation values) at θ=0° were measured and there was obtained such a film thickness—retardation value relation as shown in FIG. 4. As is seen from the same figure, the film thicknesses and the retardation values are not in a linear relation, thus indicating that the orientation obtained is not a uniform tilt orientation. The dotted line in the figure is a straight line which is usually observed in a film of uniform tilt orientation.

Then, in the same way as above, the above liquid crystalline composition was oriented and orientation-fixed on a glass substrate of a high refractive index (1.84) having a rubbed polyimide film, to prepare film 1'. Using the film 1', there was made a refractive index measurement.

The film 1' was disposed in such a manner that the glass substrate came into contact with a prism surface of the refractometer and that the substrate interface side of the film was positioned below the air interface side thereof. In this case, intra-film surface refractive indices were anisotropic. The refractive index in a surface perpendicular to the rubbing direction was 1.55 and the refractive index in a surface parallel to the rubbing direction was 1.71. Further, the refractive index in the film thickness direction was 1.55 independently of the film direction. Thus, it turned out that, on the glass substrate side, rod-like liquid crystal molecules constituting the liquid crystalline polyesters were oriented planarly in parallel with the substrate. Next, the film was disposed in such a manner that its air interface side came into contact with the prism surface of the refractometer. In this case, no anisotropy was found in intra-film surface refractive indices, and there was observed a constant refractive index of 1.55. Also in the film thickness direction there was observed a constant refractive index of 1.71 independently of the direction of the film 1'. Thus, it turned out that, on the air interface side of the film, rod-like liquid crystal molecules of the liquid crystalline polyesters were oriented perpendicularly to the substrate surface.

Figure 5:
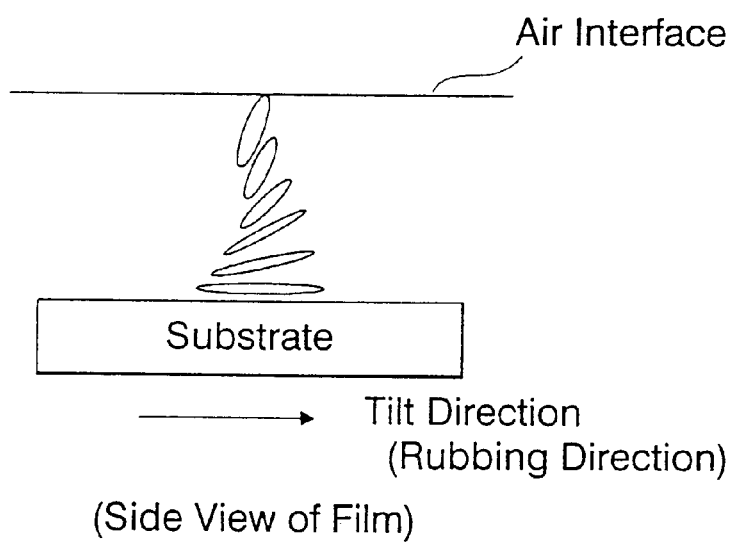
FIG. 5 is a conceptual diagram showing an orientation structure of film 1 obtained in Example 1.

The above results show that the film obtained in this Example has such a nematic hybrid orientation as shown in FIG. 5 and that the orientation is ensured with a restricting force of the substrate interface induced by rubbing and that of the air interface.

Next, the following operation was performed to determine the angle of director direction at the substrate interface more accurately.

Another glass substrate having a rubbed polyimide film was brought into close contact with the upper surface of the film 1' formed on the above high refractive index glass substrate having a rubbed polyimide film. That is, the film 1' was sandwiched in between two rubbed polyimide films. In this case, both glass substrates were disposed so that the rubbing directions of the upper and lower rubbed films were at 180° relative to each other. In this state there was made heat treatment at 190° C. for 30 minutes. The sample film thus obtained was then subjected to refractive index measurement and polarization analysis. As a result of the refractive index measurement there was obtained the same value for both upper and lower surfaces of the sample film. Intra-film surface refractive indices were 1.55 in a plane perpendicular to the rubbing direction, 1.71 in a plane parallel to the rubbing direction, and 1.55 in the film thickness direction. From this result it turned out that, in the vicinity of substrate interfaces, directors were nearly parallel to substrate surfaces in both upper and lower portions of the sample film. Further, as a result of polarization analysis, the sample film proved to have a substantially uniaxial refractive index structure. On this regard, a detailed ananlysis was made in accordance with a crystal rotation method. As a result, a slight tilt of director was observed in the vicinity of a substrate interface and the director-substrate surface angle was about 3°. Further, the tilting direction of the director was coincident with the rubbing direction (the film tilt direction and the rubbing direction coincide with each other).

From the above results it is presumed that the direction of director at a substrate interface is determined substantially by an interaction between the liquid crystalline polyesters and an orienting substrate interface. Consequently, the direction of director at a substrate interface in the nematic hybrid orientation of each of the films 1 and 1' formed on a single orienting substrate described above is presumed to be a direction of 3° relaltive to the substrate interface.

Example 2

There was prepared a solution in tetrachloroethane containing 8 wt % of the same liquid crystalline composition as that in Example 1. The solution was applied onto a glass substrate having a rubbed polyimide film by a spin coating method and then dried, followed by heat treatment at 210° C. for 10 minutes and subsequent cooling, to afford film 2. The film 2 on the substrate was transparent and uniform, involving no orientation defect. The film thickness was 0.42 μm and an average tilt angle in the film thickness direction was 36°.

Figure 6:
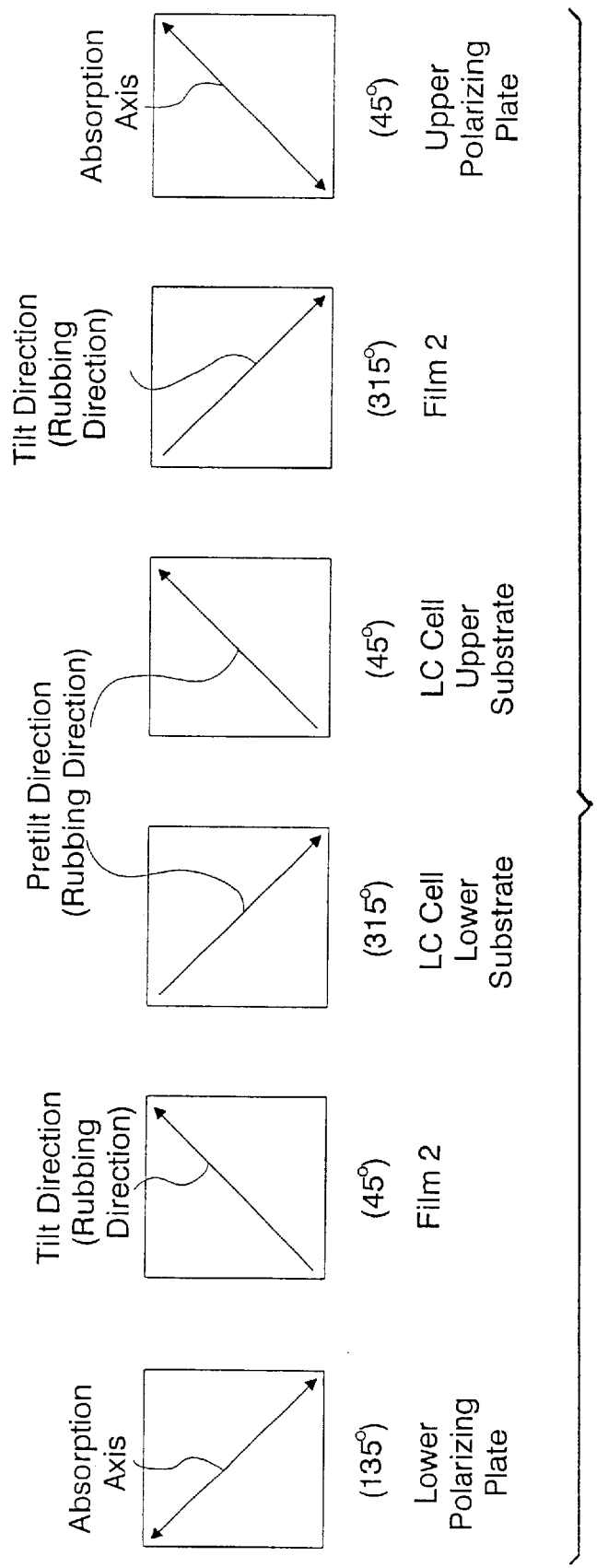
FIG. 6 is a diagram showing an axial configuration of optical elements used in Example 2.
Figure 7:
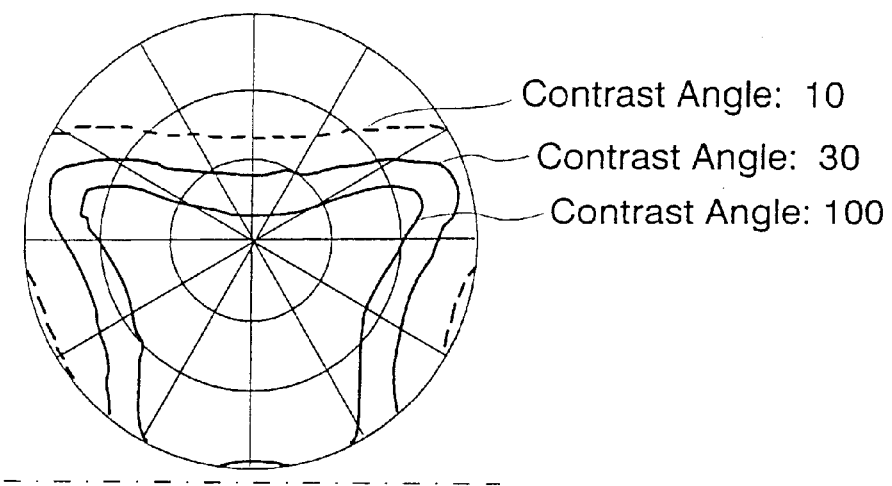
FIG. 7 is a diagram showing equicontrast curves obtained in Example 2.

Using two films 2, optical elements were disposed in such an axial configuration as shown in FIG. 6. At this time, the films 2 were disposed respectively above and below a liquid crystal cell. The liquid crystal cell, which was formed using a liquid crystal material ZLI-4792, had such cell parameters as a cell gap of 4.8 μm, a twist angle of 90° (left-hand twist) and a pretilt angle of 4°. A voltage was applied to the liquid crystal cell using a square wave of 300 Hz. With the ratio in transmittance of white display OV to black display 6V, (white display)/(black display), as contrast ratio, contrast ratios in all directions were measured using an FFP optical system, DVS-3000 (a product of Hamamatsu Photonics Co.), to describe equicontrast curves, the results of which are shown in FIG. 7.

Figure 8:
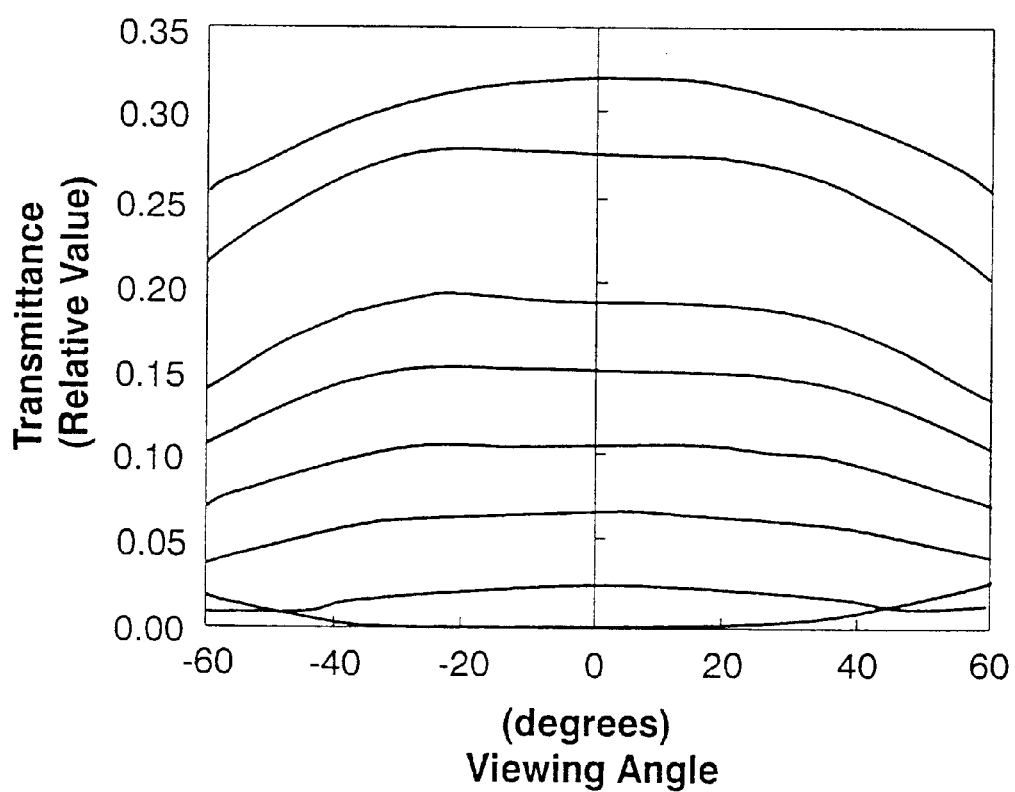
FIG. 8 is a diagram showing the results of having measured gradation characteristics in a lateral direction in Example 2.

Such a voltage as divides the difference in transmittance between white display and black display into eight equal parts in the configuration of FIG. 6, was applied to the liquid crystal cell and gradation characteristics in a lateral direction (0°–180° direction) were measured using a color luminance meter BM-5 (a product of Topcon Co.), the results of which are shown in FIG. 8.

Comparative Example 1

Figure 9:
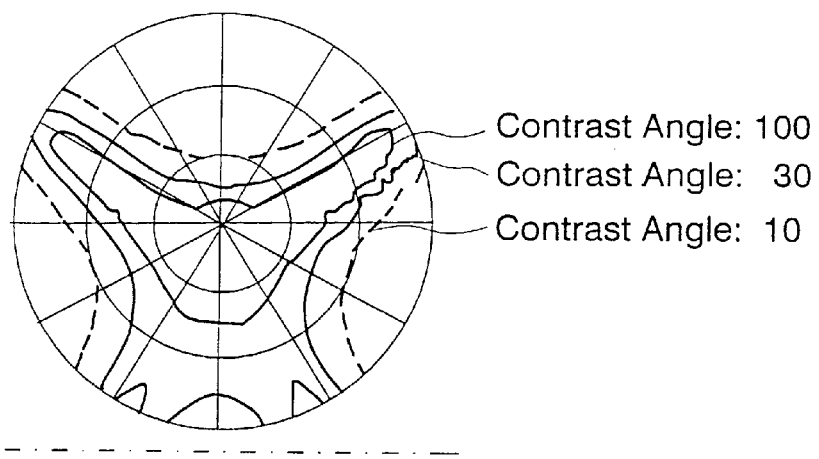
FIG. 9 is a diagram showing equicontrast curves obtained in Comparative Example 1.
Figure 10:
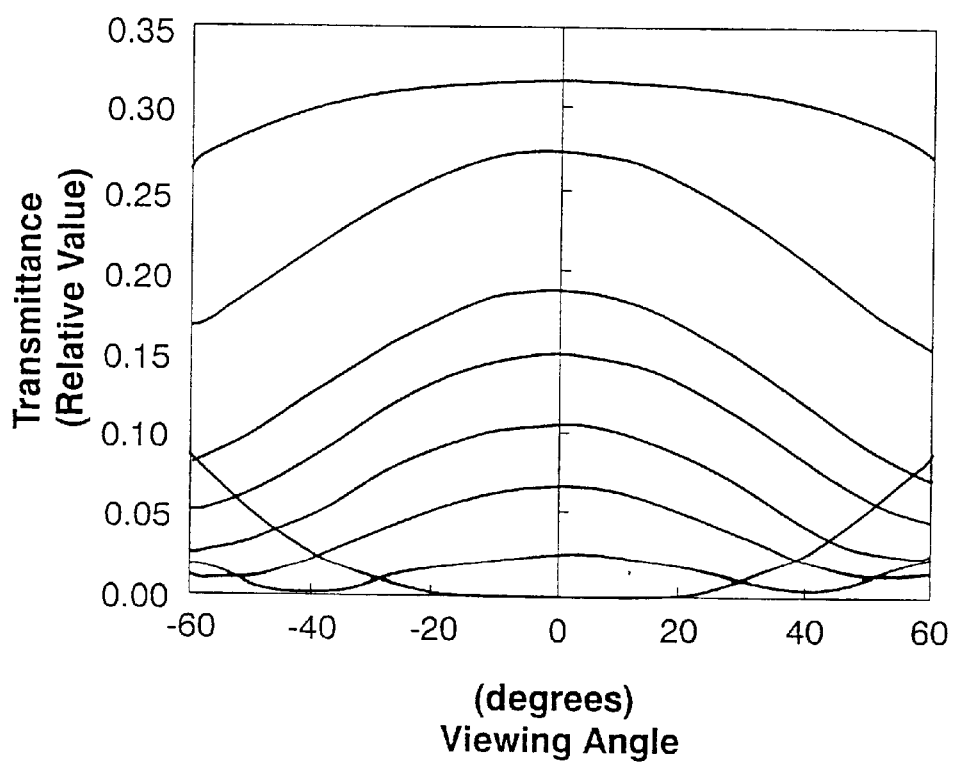
FIG. 10 is a diagram showing gradation characteristics in a lateral direction obtained in Comparative Example 1.

Using the same TN type liquid crystal cell as in Example 2 and under the same conditions as in Example 2 except that the film 2 was not used, contrast ratios were measured in all directions and gradation characteristics were measured in the lateral direction (0°–180° direction), the results of which are shown in FIGS. 9 and 10.

Reference Example 4

22 mmols of 4-(2-ethylhexyloxy)phenol was dissolved in 500 ml of pyridine, and a solution of 10 mmols terephthalic acid dichloride in 200 ml methylene chloride was added dropwise at 0° C. over a period of 30 minutes while stirring was conducted using a mechanical stirrer. Reaction was allowed to take place at 0° C. for 2 hours and at room temperature for 5 hours, thereafter, pyridine was distilled off under reduced pressure. Then, 500 ml of 1N hydrochloric acid was added to the residue, followed by extraction with ethyl acetate. The extract was washed again with IN hydrochloric acid, then washed with water, aqueous sodium bicarbonate, and saturated aqueous NaCl successively in this order. The extract was then dried over magnesium sulfate and the solvent was distilled off, then the residue was recrystallized from a mixed methanol/ethyl acetate solvent, to afford a compound of formula 4.

Formula 4

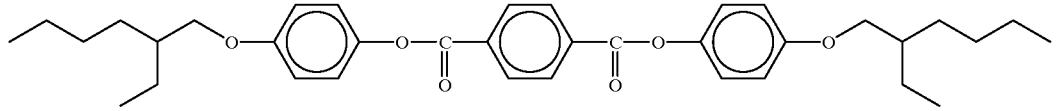

Example 3

70 parts of the liquid crystalline polyester (formula 1), 27 parts of the liquid crystalline polyester (formula 2), and 3 parts of the compound (formula 4), prepared in the above Reference Examples 1, 2 and 4, respectively, were mixed together to prepare a liquid crystalline composition.

Then, a 10 wt % solution of this composition in N-methylpyrrolidone was prepared. Further, for lowering the surface tension of the solution, KH-40 (a product of Asahi Glass Co.) was added 0.005% based on the total weight of the solution.

Coating, drying and heat treatment were conducted under the same conditions as in Example 2 to prepare film 3.

Figure 11:
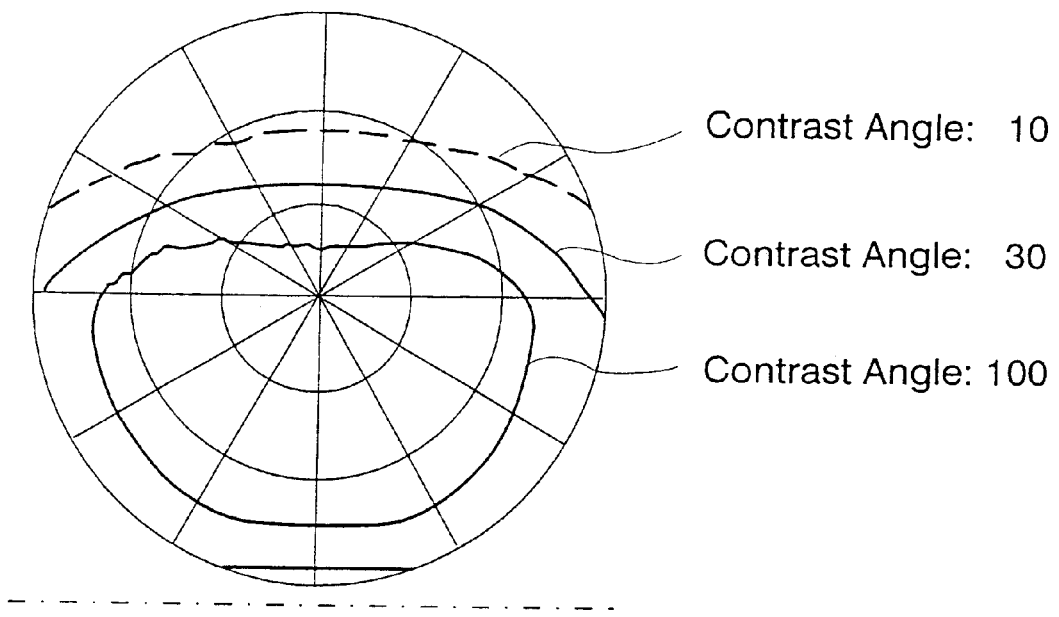
FIG. 11 is a diagram showing equicontrast curves obtained in Example 3.

The film 3 had a thickness of 0.50 μm and an average tilt angle in the film thickness direction of 30°. Using this film, contrast ratios were measured in all directions in the same manner as in Example 2, the results of which are shown in FIG. 11.

Reference Example 5

Using 20 mmols of 4-benzyloxybenzoic acid and 10 mmols of catechol diacetate, a deacetylation reaction was conducted in a nitrogen atmosphere at 270° C. for 4 hours, and then at the same temperature for 2 hours in a current of nitrogen gas fed at a rate of 30 ml/min. The resulting reaction product was dissolved in tetrachloroethane and subsequent reprecipitation using methanol afforded a compound of formula 5.

Formula 5

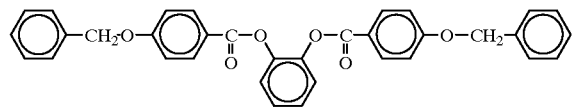

The compound thus prepared was then dissolved in 500 ml of ethyl acetate and the resulting solution was subjected to a hydrogenolysis reaction in a hydrogen atmosphere of 2 atm. at room temperature for 2 hours together with 1 g of 5% Pd/C catalyst, allowing the benzyl group to split off. Then, the reaction product was dissolved in a mixture of 500 ml methylene chloride with 1 g of dimethylaminopyridine added thereto and 100 ml of pyridine, and a solution of 20 mmols 4-octyloxybenzoic acid chloride in 200 ml methylene chloride was added dropwise at 0° over a 30-minute period. Reaction was allowed to take place at 0° C. for 2 hours and at room temperature for 5 hours, thereafter, pyridine was distilled off under reduced pressure. 500 ml of 1N hydrochloric acid was added to the residue, followed by extraction with ethyl acetate. The extract was washed again with IN hydrochloric acid and then washed with water, aqueous sodium bicarbonate, and saturated aqueous NaCl successive in this order. The extract was then dried over magnesium sulfate and thereafter the solvent was distilled off. Subsequently, the residue was dissolved in chloroform and the resulting solution was subjected to reprecipitation with methanol to afford a compound of formula 6.

Formula 6

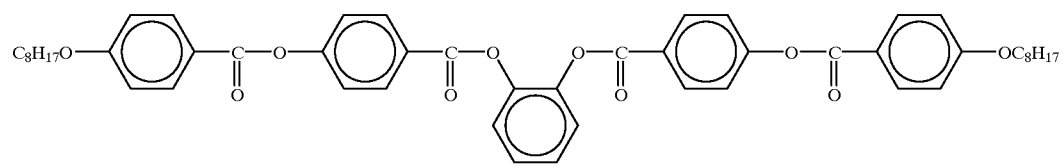

Reference Example 6

20 mmols of 2-benzyloxyphenol was dissolved in 500 ml of pyridine and a solution of 10 mmols 4,4'-oxybis(benzoic acid dichloride) in 200 ml methylene chloride was added dropwise over a 30-minute period. Reaction was allowed to take place at 0° C. for 2 hours and at room temperature for 5 hours, thereafter, pyridine was distilled off under reduced pressure. 500 ml of 1N hydrochloric acid was added to the residue, followed by extraction with ethyl acetate. The extract was washed again with iN hydrochloric acid and then washed with water, aqueous sodium bicarbonate, and saturated aqueous NaCl successively in this order. The extract was then dried over magnesium sulfate and thereafter the solvent was distilled off. The resulting residue was recrystallized using a mixed methanol/ethyl acetate solvent to afford a compound of formula 7.

Formula 7

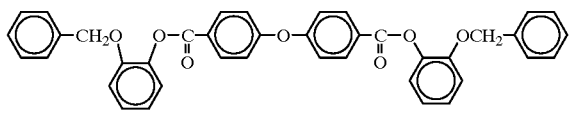

The compound thus prepared was then dissolved in 500 ml of ethyl acetate and the resulting solution was subjected to a hydrogenolysis reaction in a hydrogen atmosphere of 2 atm. at room temperature for 24 hours together with 1 g of 5% Pd/C catalyst, allowing the benzyl group to split off. The reaction product was then dissolved in a mixture of 500 ml methylene chloride with 1 g of dimethylaminopyridine added thereto and 100 ml pyridine, and a solution of 20 mmols 4'-butoxystilbene-4-carboxylic acid chloride in 200 ml methylene chloride was added dropwise over a 30-minute period at 0° C. Reaction was allowed to take place at 0° C. for 2 hours and at room temperature for 5 hours, thereafter, pyridine was distilled off under reduced pressure. 500 ml of 1N hydrochloric acid was added to the residue, followed by extraction with ethyl acetate. The extract was washed again with IN hydrochloric acid and then washed with water, aqueous sodium bicarbonate, and saturated aqueous NaCl successively in this order. Then, the extract was dried over magnesium sulfate and thereafter the solvent was distilled off. Subsequently, the residue was dissolved in N-methylpyrrolidone and the resulting solution was subjected to reprecipitation with methanol to afford a compound of formula 8.

Formula 8

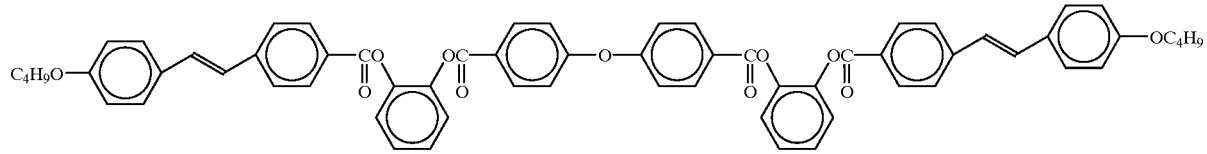

Reference Examples 7~18

100 mmols of a compound X in Table 1 and 20 mmols of a compound Y in the same table were mixed together and reaction was allowed to take place in a nitrogen atmosphere at 250° C. for 4 hours, at 270° C. for 2 hours, and subsequently at 270° for 2 hours in a current of nitrogen gas fed at a rate of 30 ml/min. As to compounds (11), (13), (15), (16), (17) and (20), they were purified by recrystallization from a mixed methanol/ethyl acetate-(1/1) solvent. On the other hand, as to compounds (9), (10), (12), (14), (18) and (19), they were purified by dissolving crude products in chloroform and subsequent dropwise addition into methanol and reprecipitation of products.

TABLE 1

| Reference Example | Compound | X | Y |
|---|---|---|---|
| 7 | (9) | bisphenol A-diacetate | 4-hexyloxy-benzoic acid |
| 8 | (10) | resorcinol diacetate | 5-hexyloxy-2-naphthoic acid |
| 9 | (11) | 1,4-diacetoxy-naphthalene | 4-pentyloxy cinnamic acid |
| 10 | (12) | 1,8-diacetoxy naphthalene | (±)-4-methyloxy benzoic acid |
| 11 | (13) | hydroquinone diacetate | 3-heptyloxy benzoic acid |
| 12 | (14) | methylhydroquinone diacetate | 3,4-dipentyloxy benzoic acid |
| 13 | (15) | methylhydroquinone diacetate | 4-octyloxy benzoic acid |
| 14 | (16) | 4,4'-diacetoxy biphenyl | 3-octyloxy benzoic acid |
| 15 | (17) | catechol | 4-hexyloxy cinnamic acid |
| 16 | (18) | 3-methyl catechol | 4-pentyloxyphenyl acetic acid |
| 17 | (19) | 3-tert-butyl catechol | tert-butyl benzoic acid |
| 18 | (20) | chlorohydroquinone | 4-pentyloxyphenyl acetic acid |

Formula 9 (Compound 9)

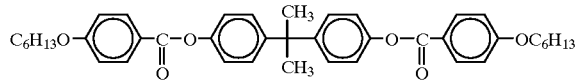

Formula 10 (Compound 10)

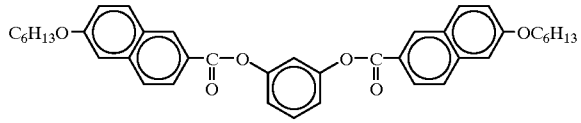

33

Formula 11 (Compound 11)

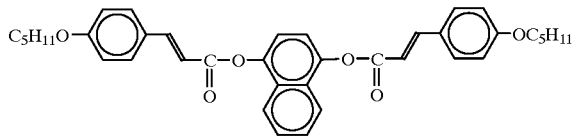

Formula 12 (Compound 12)

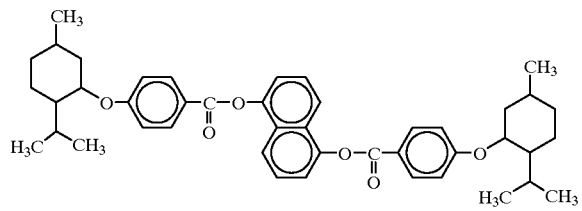

Formula 13 (Compound 13)

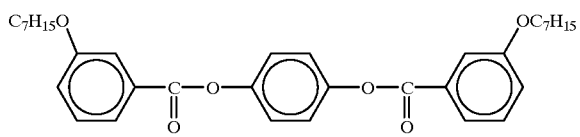

Formula 14 (Compound 14)

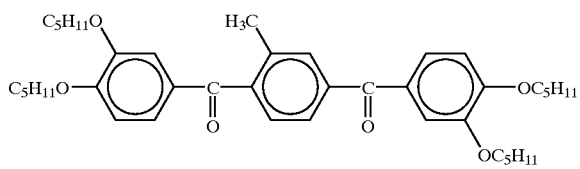

Formula 15 (Compound 15)

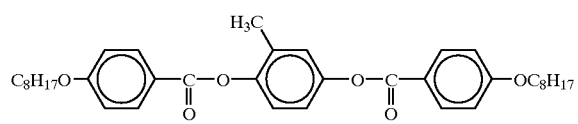

Formula 16 (Compound 16)

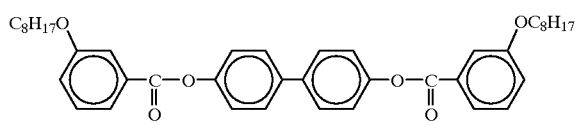

34

Formula 17 (Compound 17)

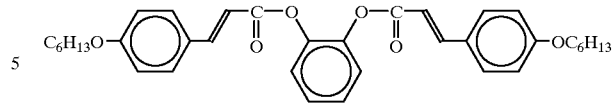

Formula 18 (Compound 18)

Formula 19 (Compound 19)

Formula 20 (Compound 20)

Reference Examples 19~25

200 ml of a compound X in Table 2 was dissolved in 500 ml of pyridine and a solution of a compound Y in the same table dissolved in 200 ml methylene chloride was added dropwise over a 30-minute period at 0° C. while stirring was conducted using a a mechanical stirrer. Reaction was allowed to take place at 0° C. for 2 hours and at room temperature for 5 hours, thereafter, pyridine was distilled off under reduced pressure. 500 ml of 1N hydrochloric acid was added to the residue, followed by extraction with ethyl acetate. The extract was washed again with 1N hydrochloric acid and then washed with water, aqueous sodium bicarbonate, and saturated aqueous NaCl successively in this order. The extract was then washed over magnesium sulfate and the solvent was distilled off.

Therafter, as to compounds (21), (23), (25), (26) and (27), they were purified by recrystallization from a mixed methanol/ethyl acetate (1/1) solvent. On the other hand, as to compounds (22) and (24), they were purified by dissolving crude products in chloroform and subsequent addition into methanol and reprecipitation of products.

TABLE 2

| Reference Example | Compound | X | Y |
|---|---|---|---|
| 19 | (21) | 2,4-dibutoxy benzoic dichloride | 4-hexylphenol |
| 20 | (22) | isophthalic dichloride | 4-octyloxyphenol |
| 21 | (23) | terephthalic dichloride | 4-benzyloxy-1-naphthol |
| 22 | (24) | 2,6-naphthalene dicarboxylic dichloride | nonylphenol |
| 23 | (25) | trans-1,4-cyclohexane dicarboxylic dichloride | 4-hexylphenol |
| 24 | (26) | terephthalic dichloride | 4-hexyloxybenzyl alcohol |
| 25 | (27) | 4,4'-oxybis (benzoic chloride) | 4-hexyloxyphenol |

Formula 21 (Compound 21)

Formula 22 (Compound 22)

Formula 23 (Compound 23)

Formula 24 (Compound 24)

isomer mixture

Formula 25 (Compound 25)

Formula 26 (Compound 26)

Formula 27 (Compound 27)

Examples 4~34

Films were prepared in the same way as in Example 3 and then evaluated, the results of which are shown in Table 3.

TABLE 3

| Ex. No. | LC Composition Additive Compd. | LC Composition Additive Amount (parts) | LC Polymer (1) (parts) | LC Polymer (2) (parts) | Orientation ○: uniform defects | Thickness ($\mu$m) | Average Tilt Angle (deg.) | Viewing Angle Compensation Effect |
|---|---|---|---|---|---|---|---|---|
| 4 | (3) | 10 | 90 | 0 | ○ | 0.70 | 19 | ○ |
| 5 | (3) | 10 | 81 | 9 | ○ | 0.50 | 25 | ○ |
| 6 | (3) | 10 | 63 | 27 | ○ | 0.40 | 33 | ○ |
| 7 | (4) | 5 | 85 | 10 | ○ | 0.51 | 27 | ○ |
| 8 | (5) | 5 | 65 | 30 | ○ | 0.53 | 33 | ○ |
| 9 | (6) | 5 | 65 | 30 | ○ | 0.57 | 32 | ○ |
| 10 | (7) | 5 | 65 | 30 | ○ | 0.54 | 34 | ○ |
| 11 | (8) | 5 | 65 | 30 | ○ | 0.49 | 33 | ○ |
| 12 | (9) | 5 | 65 | 30 | ○ | 0.53 | 31 | ○ |
| 13 | (10) | 5 | 65 | 30 | ○ | 0.57 | 36 | ○ |
| 14 | (11) | 5 | 65 | 30 | ○ | 0.77 | 34 | ○ |
| 15 | (11) | 3 | 65 | 32 | ○ | 0.75 | 34 | ○ |
| 16 | (12) | 5 | 65 | 30 | ○ | 0.66 | 36 | ○ |
| 17 | (13) | 5 | 65 | 30 | ○ | 0.63 | 34 | ○ |
| 18 | (14) | 5 | 65 | 30 | ○ | 0.59 | 32 | ○ |
| 19 | (15) | 5 | 65 | 30 | ○ | 0.60 | 35 | ○ |
| 20 | (16) | 5 | 65 | 30 | ○ | 0.61 | 31 | ○ |
| 21 | (17) | 5 | 65 | 30 | ○ | 0.62 | 33 | ○ |
| 22 | (18) | 5 | 65 | 30 | ○ | 0.58 | 35 | ○ |

TABLE 3-continued

| Ex. No. | LC Composition Additive Compd. | Additive Amount (parts) | LC Polymer (parts) (1) | LC Polymer (parts) (2) | Orientation ○: uniform defects | Average Thickness (μm) | Viewing Angle Tilt Angle (deg.) | Viewing Angle Compensation Effect |
|---|---|---|---|---|---|---|---|---|
| 23 | (19) | 5 | 65 | 30 | ○ | 0.55 | 29 | ○ |
| 24 | (20) | 5 | 65 | 30 | ○ | 0.54 | 34 | ○ |
| 25 | (21) | 5 | 65 | 30 | ○ | 0.57 | 35 | ○ |
| 26 | (22) | 5 | 65 | 30 | ○ | 0.60 | 36 | ○ |
| 27 | (23) | 5 | 65 | 30 | ○ | 0.53 | 29 | ○ |
| 28 | (24) | 5 | 65 | 30 | ○ | 0.61 | 30 | ○ |
| 29 | (25) | 5 | 65 | 30 | ○ | 0.62 | 33 | ○ |
| 30 | (26) | 5 | 65 | 30 | ○ | 8.61 | 31 | ○ |
| 31 | (27) | 5 | 65 | 30 | ○ | 0.66 | 34 | ○ |
| 32 | (28) | 5 | 65 | 30 | ○ | 0.62 | 36 | ○ |
| 33 | (29) | 5 | 65 | 30 | ○ | 0.64 | 35 | ○ |
| 34 | (30) | 5 | 65 | 30 | ○ | 0.67 | 37 | ○ |
| Com. Ex. 2 | .. | .. | 100 | 0 | X | 0.70 | 21 | — |
| Com. Ex. 3 | .. | .. | 90 | 10 | X | 0.50 | 26 | — |
| Com. Ex. 4 | .. | .. | 70 | 30 | X | 0.40 | 35 | — |

Compound 28: didecyl-4,4'-biphenyldicarboxylate
Compound 29: 4,4'-didodecyloxy- -methylstylbene
Compound 30: (4-hexylphenyl)-4-octyloxybenzoate

What is claimed is:

1. A film for optical elements comprising a liquid crystalline composition film having a thickness of 0.1 to 20 microns, said film heat treated at a temperature at the range of 50° C. to 300° C. for a period of time ranging between 10 seconds and 120 minutes, whereby liquid crystal orientation is formed, said film formed from a liquid crystalline composition, said composition comprising (a) a liquid crystalline polymer which exhibits an optically positive uniaxial property; and
   (b) 0.1 to 20 wt. %, based on the weight of said component (a), of a polycyclic compound having the general formula $R^1$—$(B^1$—$A^1)$—$(B^2$—$A^2)$— . . . —$(B^n$—$A^n)$—$B^{n+1}$—$R^2$, where $R^1$ and $R^2$ are independently a hydrocarbon group having 1 to 20 carbon atoms; $A^1$ to $A^n$ are each a ring structure bonded to different constituent atoms to two adjacent $B^n$s; $B^1$ to $B^{n+1}$ are each a single bond or an organic group of 1 to 4 atoms interposed between any of adjacent radicals $R^1$, $R^2$ and $A^n$; and n is an integer of 2 to 8, said polycyclic compound having a molecular weight of from 410 to 1,000.

2. A film for optical elements as set forth in claim 1, wherein said orientation form is a nematic hybrid orientation.

3. A viewing angle improving film for a liquid crystal display, constituted by the film of claim 1 or claim 2.

4. A viewing angle improving film laminate for a liquid crystal display, comprising at least the film of claim 1 or claim 2 and an optically anisotropic film.

5. An elliptic polarizing plate, comprising at least the film of claim 1 or claim 2 and a polarizing plate.

6. A liquid crystal display having at least the film of claim 1 or claim 2.

* * * * *